(12) United States Patent
Sasaki

(10) Patent No.: US 6,738,232 B1
(45) Date of Patent: May 18, 2004

(54) THIN-FILM MAGNETIC HEAD AND METHOD OF MANUFACTURING SAME AND THIN-FILM MAGNETIC HEAD MATERIAL AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/514,297

(22) Filed: Feb. 28, 2000

(30) Foreign Application Priority Data

Mar. 29, 1999 (JP) .............................. 11-087205

(51) Int. Cl.[7] .......................... G11B 5/127; G11B 5/39; H04R 37/00
(52) U.S. Cl. .................................... 360/317; 29/603.14
(58) Field of Search ................................. 360/317, 324, 360/325, 326, 327, 327.33, 119, 120–122, 125, 126; 29/603.11, 603.15, 603.16, 603.18, 603.07, 603.13

(56) References Cited

U.S. PATENT DOCUMENTS

| | | | |
|---|---|---|---|
| 5,438,747 A | | 8/1995 | Krounbi et al. ........... 29/603.16 |
| 5,793,578 A | * | 8/1998 | Heim et al. ................ 360/126 |
| 5,935,644 A | * | 8/1999 | Heim et al. ................ 427/116 |
| 6,111,724 A | * | 8/2000 | Santini ........................ 360/126 |
| 6,156,375 A | * | 12/2000 | Hu et al. .................... 427/116 |
| 6,337,783 B1 | * | 1/2002 | Santini ........................ 360/317 |

FOREIGN PATENT DOCUMENTS

| | | |
|---|---|---|
| JP | 60-10409 | 1/1985 |
| JP | 62-245509 | 10/1987 |
| JP | 7-262519 | 10/1995 |

* cited by examiner

*Primary Examiner*—A. J. Heinz
*Assistant Examiner*—Angel Castro
(74) *Attorney, Agent, or Firm*—Oliff & Berridge, PLC

(57) ABSTRACT

An object of the invention is to provide thin-film magnetic heads that meet specifications required by the customer in a short time and to improve yields of the thin-film magnetic heads. A reproducing head of a thin-film magnetic head includes an MR element and a bottom shield layer and a top shield layer. A recording head of the thin-film magnetic head includes a bottom pole layer (top shield layer) and a top pole layer which include pole portions opposed to each other while a recording gap layer is placed between the pole portions. The recording head further includes a thin-film coil placed between the bottom pole layer and the top pole layer. The top shield layer includes: a first portion placed in a region including a region facing the thin-film coil; a second portion connected to a surface of the first portion facing the coil and placed on a side of a bottom shield layer; and a third portion connected to the second portion and facing the bottom shield layer with the MR element in between. The thin-film coil is located on a side of the second portion.

14 Claims, 31 Drawing Sheets

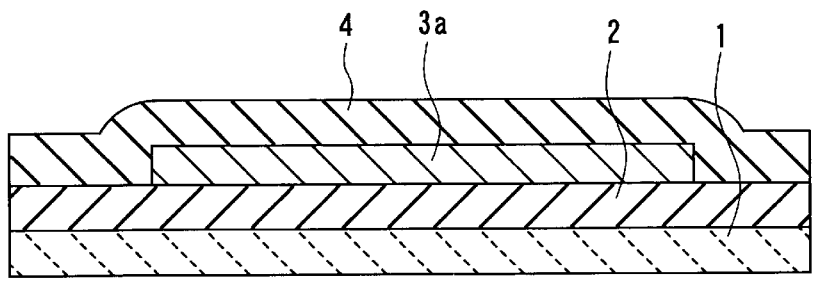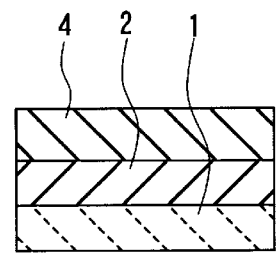
FIG. 1A  FIG. 1B
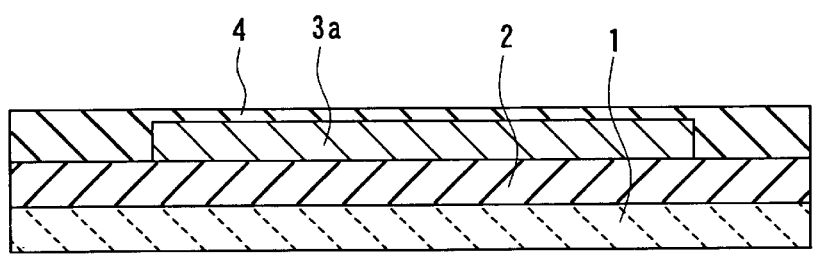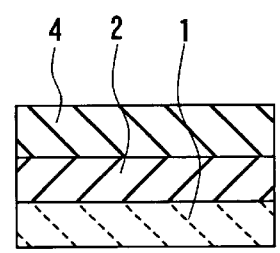
FIG. 2A  FIG. 2B
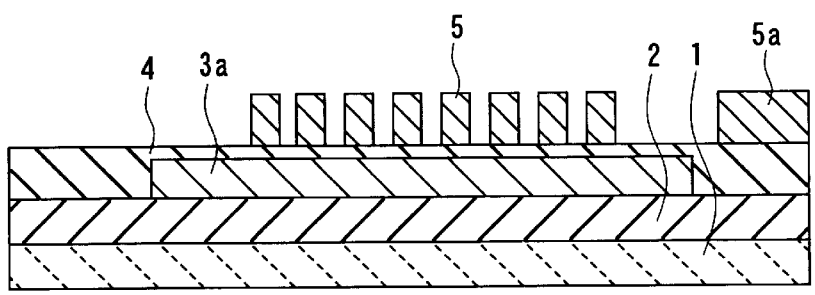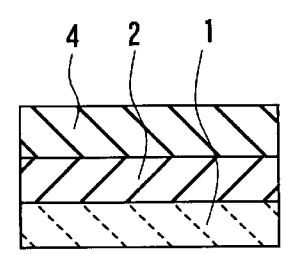
FIG. 3A  FIG. 3B

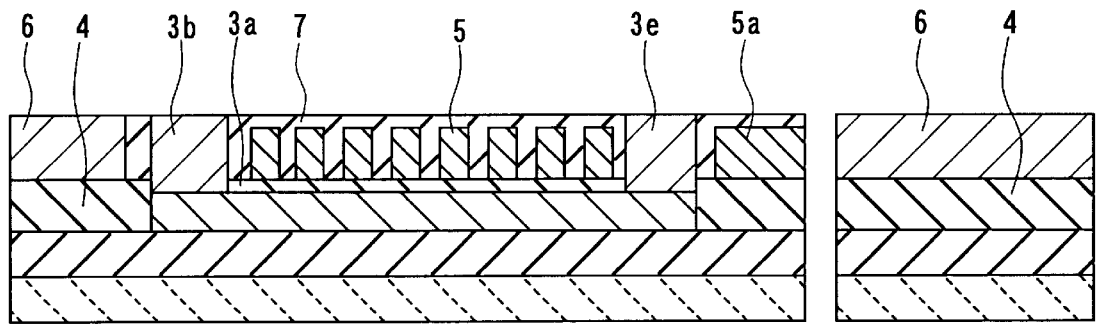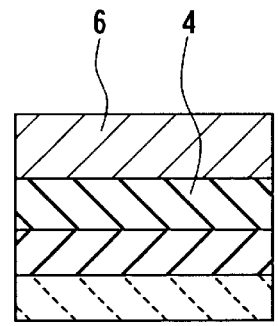
FIG. 6A    FIG. 6B
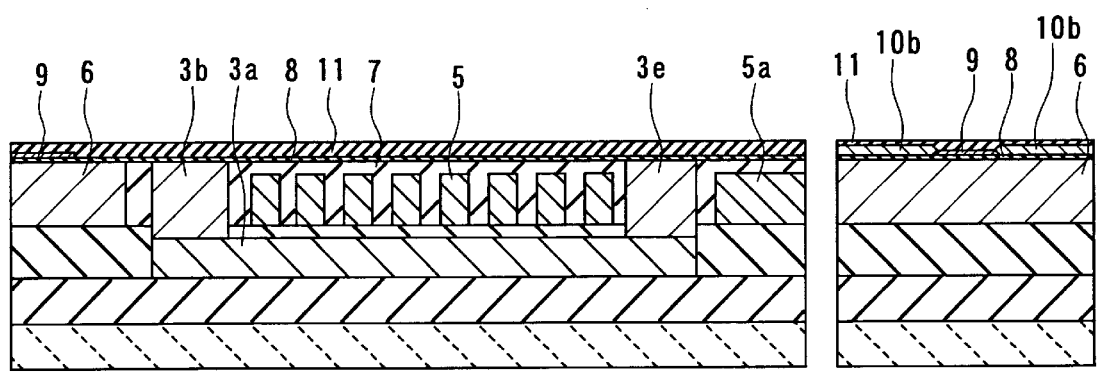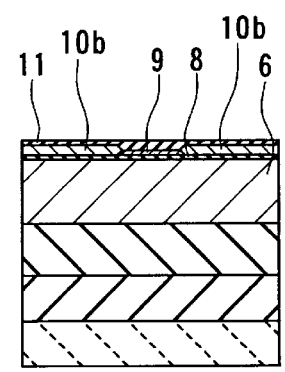
FIG. 7A    FIG. 7B

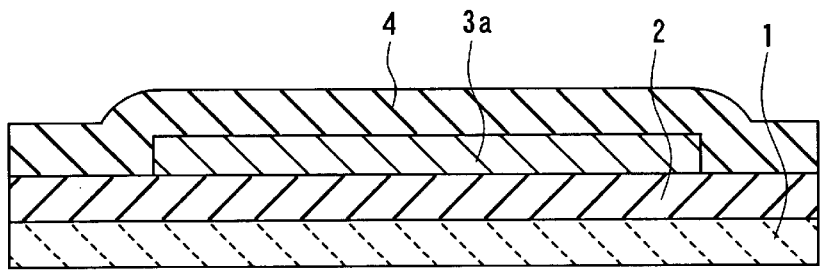 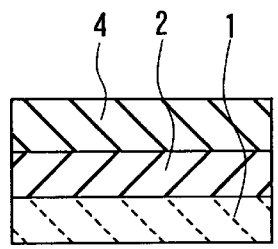
FIG. 20A  FIG. 20B
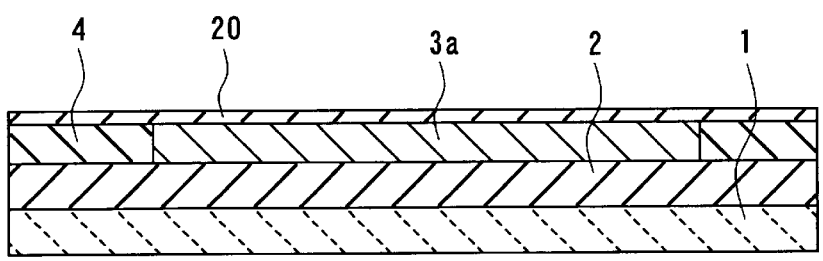 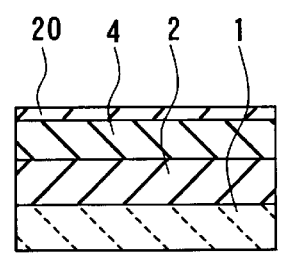
FIG. 21A  FIG. 21B
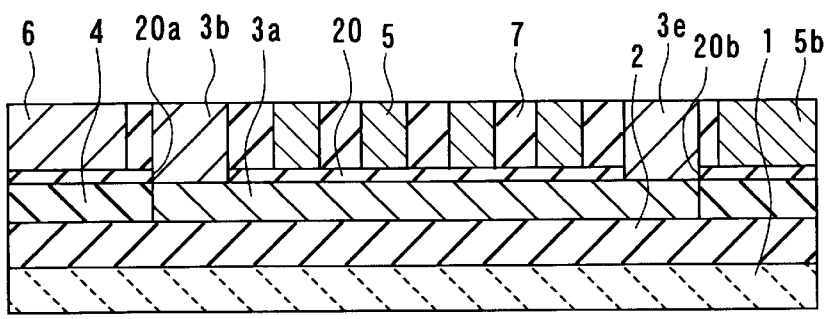 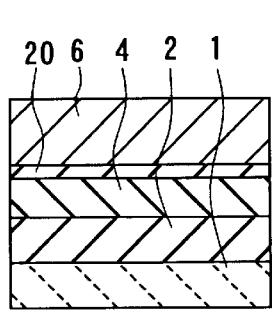
FIG. 22A  FIG. 22B

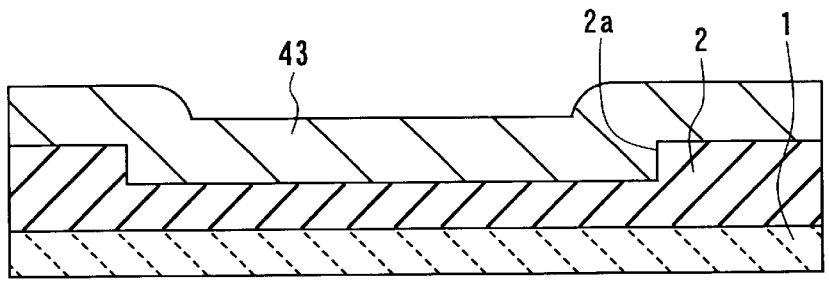 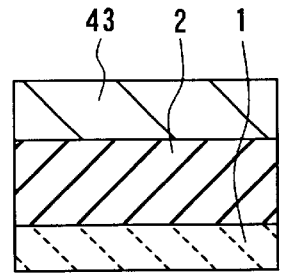
FIG. 29A FIG. 29B
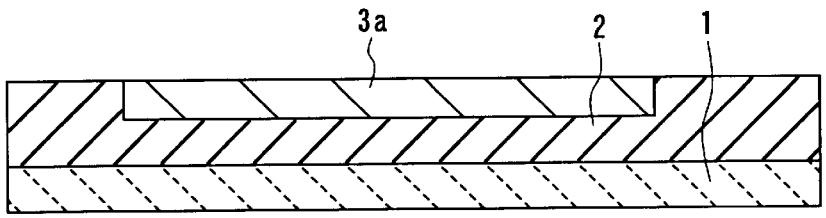 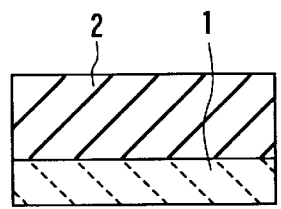
FIG. 30A FIG. 30B
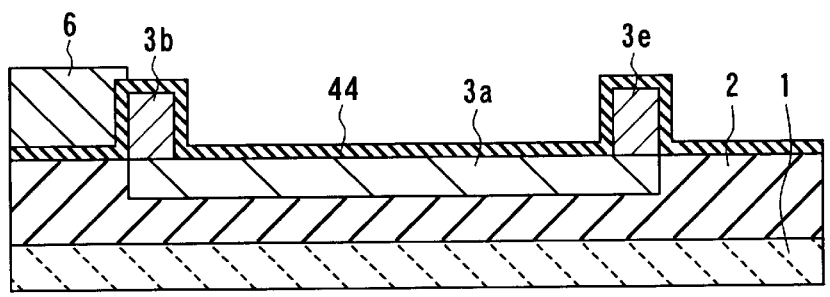 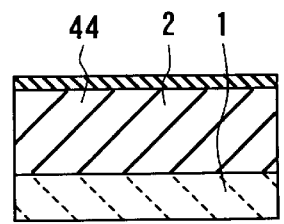
FIG. 31A FIG. 31B

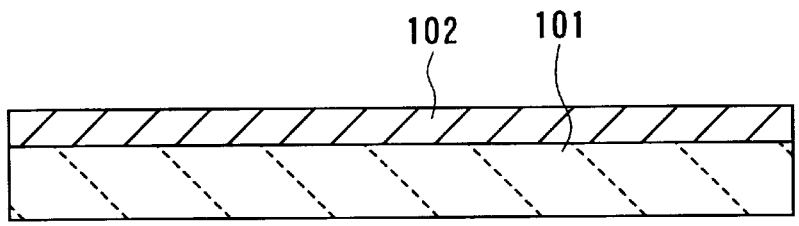 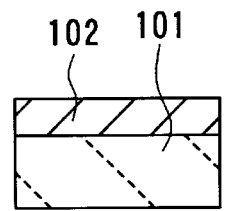
FIG. 38A
RELATED ART
FIG. 38B
RELATED ART
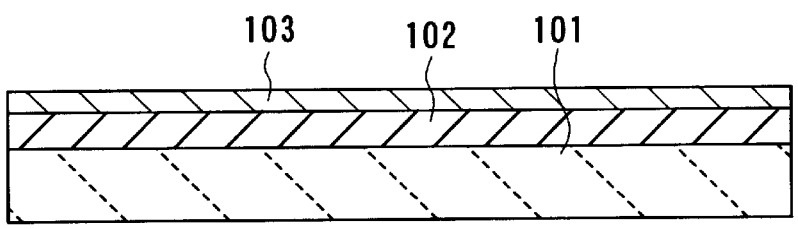 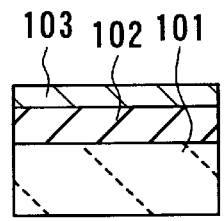
FIG. 39A
RELATED ART
FIG. 39B
RELATED ART
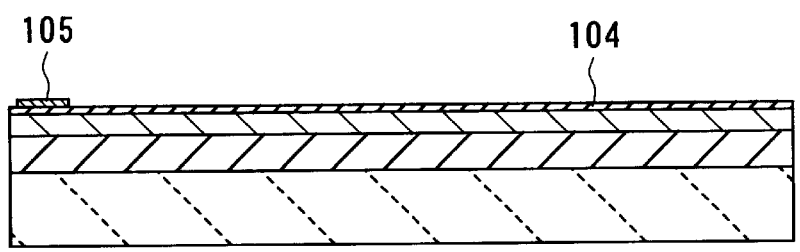 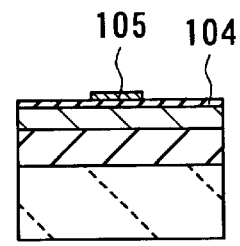
FIG. 40A
RELATED ART
FIG. 40B
RELATED ART

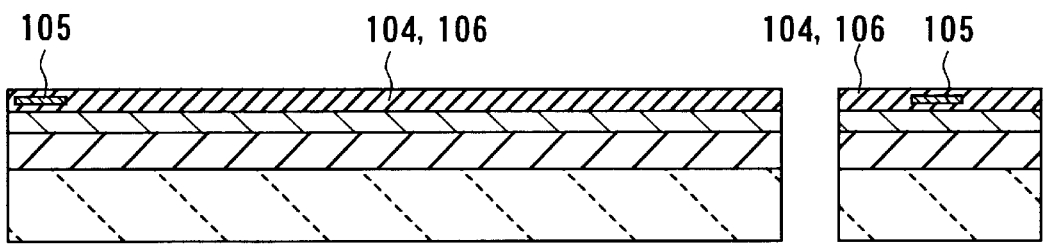
FIG. 41A
RELATED ART
FIG. 41B
RELATED ART
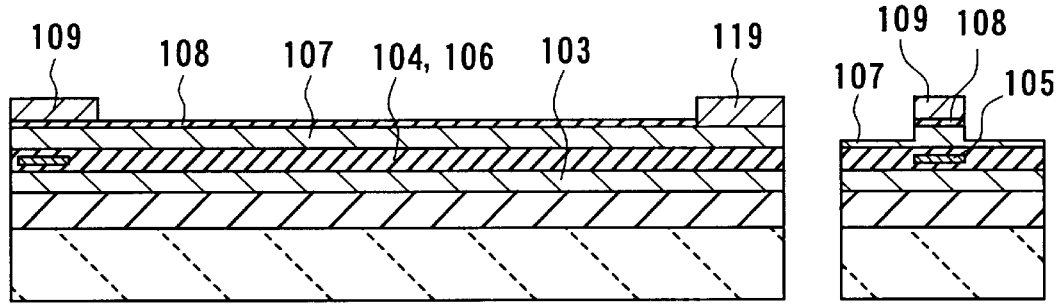
FIG. 42A
RELATED ART
FIG. 42B
RELATED ART

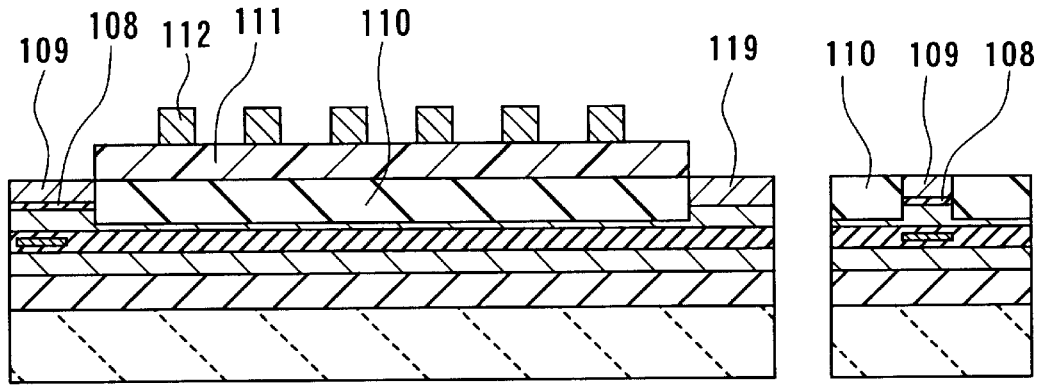
FIG. 43A
RELATED ART
FIG. 43B
RELATED ART
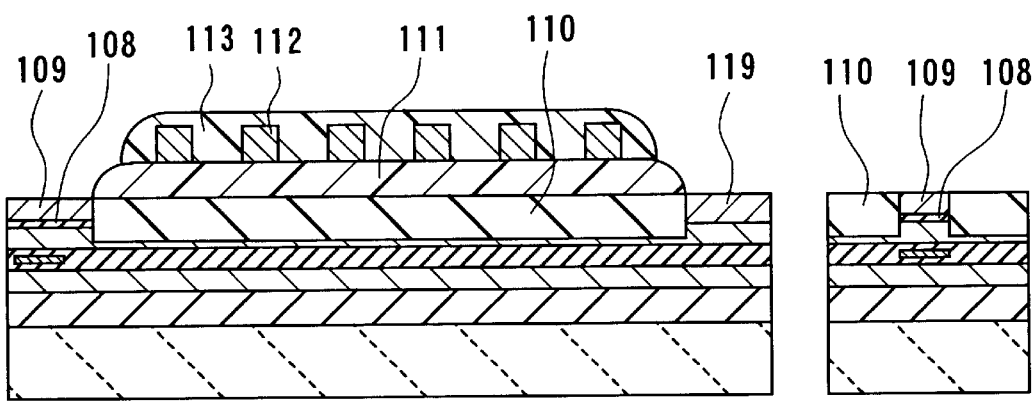
FIG. 44A
RELATED ART
FIG. 44B
RELATED ART

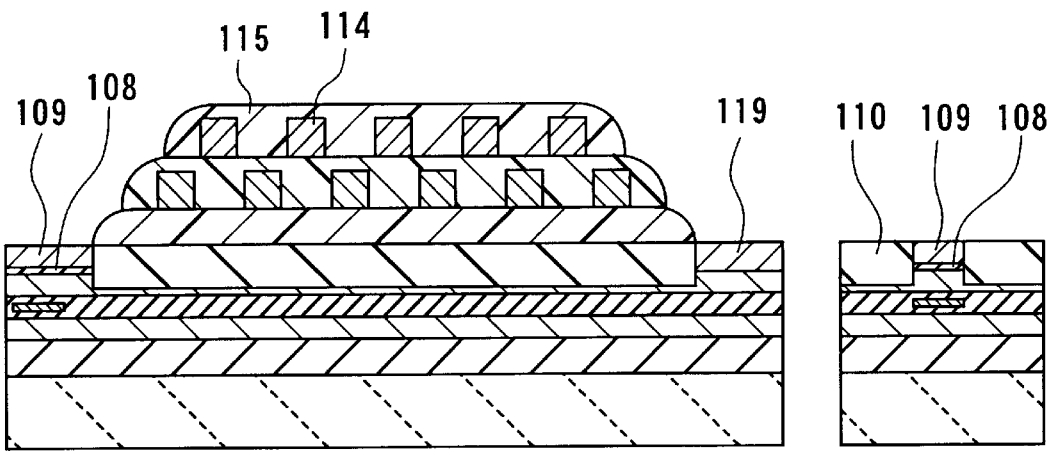
FIG. 45A
RELATED ART
FIG. 45B
RELATED ART
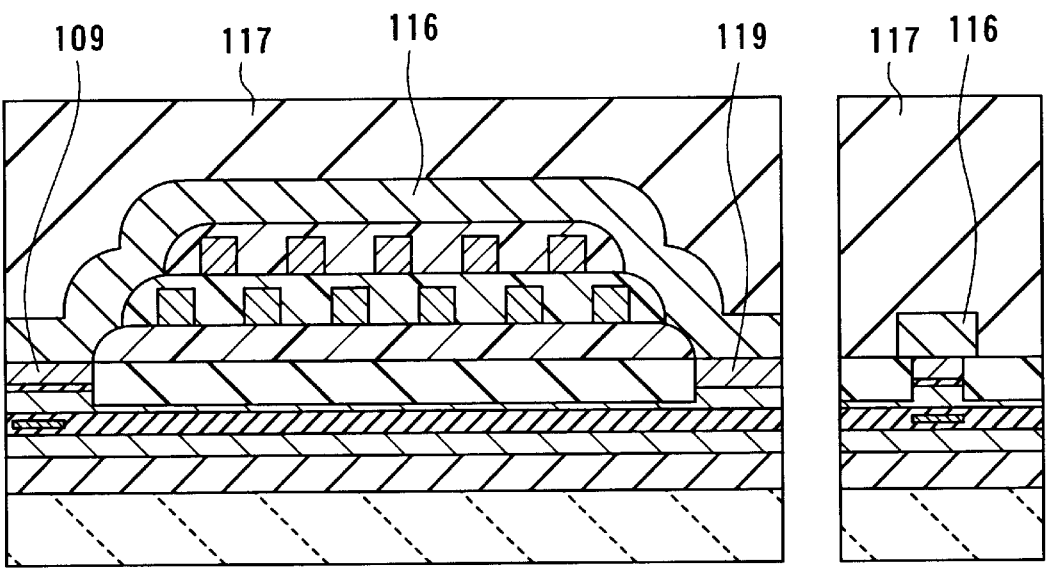
FIG. 46A
RELATED ART
FIG. 46B
RELATED ART

THIN-FILM MAGNETIC HEAD AND METHOD OF MANUFACTURING SAME AND THIN-FILM MAGNETIC HEAD MATERIAL AND METHOD OF MANUFACTURING SAME

BACKGROUND OF THE INVENTION

1. Field of the Invention

The present invention relates to a composite thin-film magnetic head comprising a recording head and a reproducing head and a method of manufacturing such a thin-film magnetic head, and to a thin-film magnetic head material used for producing such a thin-film magnetic head and a method of manufacturing such a thin-film magnetic head material.

2. Description of the Related Art

Performance improvements in thin-film magnetic heads have been sought as surface recording density of hard disk drives has increased. Composite thin-film magnetic heads have been widely used. A composite head is made of a layered structure including a recording head having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

The performance of the reproducing head is improved by replacing the AMR film with a GMR film and the like with an excellent magnetoresistive sensitivity. Alternatively, a pattern width such as an MR height, in particular, may be optimized. The MR height is the length (height) between an end of the MR element closer to the air bearing surface and the other end. The MR height is controlled by an amount of lapping when the air bearing surface is processed. The air bearing surface is a surface of the thin-film magnetic head facing toward a magnetic recording medium and may be called a track surface, too.

Performance improvements in a recording head are also required as the performance of a reproducing head is improved. One of the factors that determine the recording head performance is a pattern width such as a throat height (TH), in particular. The throat height is the length (height) of portions of magnetic pole layers facing each other with a recording gap layer in between, between the air-bearing-surface-side end and the other end. A reduction in throat height is desired in order to improve the recording head performance. The throat height is controlled as well by an amount of lapping when the air bearing surface is processed.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to a submicron order. Semiconductor process techniques are utilized to implement such a structure.

As thus described, it is important to fabricate well-balanced recording and reproducing heads to improve the performance of a thin-film magnetic head.

Reference is now made to FIG. 38A to FIG. 46A, FIG. 38B to FIG. 46B, and FIG. 47 to FIG. 49 to describe an example of a manufacturing method of a composite thin-film magnetic head as an example of a manufacturing method of a related-art thin-film magnetic head. FIG. 38A to FIG. 46A are cross sections each orthogonal to the air bearing surface. FIG. 38B to FIG. 46B are cross sections each parallel to the air bearing surface of the pole portion.

According to the manufacturing method, as shown in FIG. 38A and FIG. 38B, an insulating layer 102 made of alumina ($Al_2O_3$), for example, having a thickness of about 5 $\mu$m, is deposited on a substrate 101 made of aluminum oxide and titanium carbide ($Al_2O_3$—TiC), for example.

Next, as shown in FIG. 39A and FIG. 39B, on the insulating layer 102, a bottom shield layer 103 made of a magnetic material is formed for a reproducing head.

Next, as shown in FIG. 40A and FIG. 40B, on the bottom shield layer 103, alumina, for example, having a thickness of 40 to 70 nm, is deposited through sputtering to form a bottom shield gap film 104 as an insulating film. On the bottom shield gap film 104, an MR film of tens of nanometers in thickness is formed for making an MR element 105 for reproduction. Next, with a photoresist pattern as a mask, the MR film is etched through ion milling, for example, to form the MR element 105. The MR element 105 may be either a GMR element or an AMR element.

Next, as shown in FIG. 41A and FIG. 41B, a top shield gap film 106 as an insulating layer is formed on the bottom shield gap film 104 and the MR element 105. The MR element 105 is embedded in the shield gap films 104 and 106.

Next, as shown in FIG. 42A and FIG. 42B, on the top shield gap film 106, a top shield layer-cum-bottom pole layer (called a top shield layer in the following description) 107 is formed. The top shield layer 107 is made of a magnetic material and used for both a reproducing head and a recording head.

Next, a recording gap layer 108 made of an insulating film such as an alumina film is formed on the top shield layer 107. Next, the recording gap layer 108 is partially etched in a backward portion (the right side of FIG. 42A) to form a contact hole for making a magnetic path. Next, a top pole tip 109 for the recording head is formed on the pole portion of the recording gap layer 108. The top pole tip 109 is made of a magnetic material such as Permalloy (NiFe) or $FeN_x$ as a high saturation flux density material. The top pole tip 109 forms part of a top pole layer. At the same time, a magnetic layer 119 made of a magnetic material is formed for making the magnetic path in the contact hole for making the magnetic path.

Next, the recording gap layer 108 and the top shield layer (bottom pole layer) 107 are etched through ion milling, using the top pole tip 109 as a mask. As shown in FIG. 42B, the structure is called a trim structure wherein the sidewalls of the top pole layer (the top pole tip 109), the recording gap layer 108, and part of the top shield layer (bottom pole layer) 107 are formed vertically in a self-aligned manner. The trim structure suppresses an increase in the effective track width due to expansion of the magnetic flux generated during writing in a narrow track.

Next, as shown in FIG. 43A and FIG. 43B, an insulating layer 110 of alumina, for example, having a thickness of about 3 $\mu$m is formed over the entire surface. The insulating layer 110 is polished to the surfaces of the top pole tip 109 and the magnetic layer 119 and flattened. The polishing method may be mechanical polishing or chemical mechanical polishing (CMP). The surfaces of the top pole tip 109 and the magnetic layer 119 are thereby exposed.

On the flattened insulating layer 110 a photoresist layer 111 is formed into a specific pattern through high-precision photolithography. Next, on the photoresist layer 111 a thin-film coil 112 of a first layer is made for the induction-type recording head. The thin-film coil 112 is made of copper (Cu), for example.

Next, as shown in FIG. 44A and FIG. 44B, a photoresist layer 113 is formed into a specific pattern on the photoresist layer 111 and the coil 112. Heat treatment is performed at a temperature of 250 to 300° C., for example, to flatten the surface of the photoresist layer 113.

Next, as shown in FIG. 45A and FIG. 45B, a thin-film coil 114 of a second layer is formed on the photoresist layer 113. Next, a photoresist layer 115 is formed into a specific pattern on the photoresist layer 113 and the coil 114. Heat treatment is performed at a temperature of 250 to 300° C., for example, to flatten the surface of the photoresist layer 115.

Next, as shown in FIG. 46A and FIG. 46B, a top yoke layer 116 for the recording head is formed on the top pole tip 109, the photoresist layers 111, 113 and 115 and the magnetic layer 119. The top yoke layer 116 is made of a magnetic material such as Permalloy. Next, an overcoat layer 117 of alumina, for example, is formed to cover the top pole layer 116. Finally, machine processing of the slider is performed to form the air bearing surface of the recording head and the reproducing head. The thin-film magnetic head is thus completed.

FIG. 47 and FIG. 49 show the completed thin-film magnetic head. FIG. 47 is a cross section of the head orthogonal to the air bearing surface 120. FIG. 48 is an enlarged cross section of the pole portion parallel to the air bearing surface 120. FIG. 49 is a top view of the head. The overcoat layer 117 is omitted in FIG. 49. In FIG. 47 the throat height is indicated with 'TH' and the MR height is indicated with 'MR-H'. As shown in FIG. 48 and FIG. 49, a conductive layer 121 is provided on a side of the MR element 105.

In addition to the throat height and the MR height, another factor that determines the performance of a thin-film magnetic head is an apex angle as indicated with θ in FIG. 47. The apex is a hill-like raised coil portion covered with the photoresist layers 111, 113 and 115. The apex angle is an angle formed between the top surface of the insulating layer 110 and the straight line drawn through the edges of the pole-side lateral walls of the apex.

The performance and characteristics of a thin-film magnetic head are mainly determined by the MR element of the reproducing head and the pole portion of the recording head. To be specific, the performance and characteristics of the reproducing head are mainly determined by the track width of the reproducing head, corresponding to the MR element width. The performance and characteristics of the recording head are mainly determined by the pole portion dimensions such as the throat height and the track width of the recording head. Therefore, the demands of customers of thin-film heads are concentrated on matters relating to the process of making the MR element of the reproducing head and the pole portion of the recording head, such as the track width of the reproducing head and the throat height and the track width of the recording head.

Therefore, in order to mass-produce thin-film magnetic heads that satisfy the specifications required by the customer, it is necessary that the manufacturing steps taken to fabricate the MR element and steps that follow should conform to the customer's demands.

However, as described above with reference to FIG. 38A to FIG. 46A and FIG. 38B to FIG. 46B, the steps taken to fabricate the MR element belong to the early part of the entire steps of mass-producing thin-film heads, according to the related-art method. Therefore, the time required for steps taken to fabricate the MR element and steps that follow make up a great proportion of the time required for the entire steps in the related-art method. A long cycle time is therefore required in the related art. The cycle time is a period required between receipt of an order from the customer and completion and shipment of products conforming to the specifications required by the customer. The cycle time is about 20 to 25 days, for example. It is 30 to 40 days in some cases. Even though an agreement is made in an early stage between the customer and the manufacturer with regard to the specifications of thin-film heads such as performance characteristics, it takes many days to finally ship products.

These days technology advances at a remarkable rate and improvements are noticeable in surface recording density and reproduction rate required by the customer. Accordingly, modifications and improvements are made to the specifications of hard disk drives of computers every several months. Therefore, the customer demands that thin-film heads meeting the requirements be shipped in a short time after the order. The manufacturer is thus required to design products meeting the specifications required by the customer, mass-produce and ship the products in a short time.

Under such circumstances, it is difficult to satisfy the customer's requests since a long cycle time is required in prior art.

Inspections are performed on complete thin-film heads after the entire manufacturing steps are finished in prior art. As a result, even if non-conforming heads are produced during the manufacturing steps, it is impossible to eliminate them. It is therefore difficult to improve yields of complete products.

In order to achieve high surface density recording, that is, to fabricate a recording head with a narrow track structure, techniques are required for obtaining a submicron-order top pole layer through the use of semiconductor process techniques. As the narrow track structure is obtained, it is desired that the pole is made of a magnetic material having higher saturation flux density.

However, it is difficult to reduce the size of the top pole layer since the top pole layer is formed on the apex, that is, a hill-like raised coil portion in the related-art thin-film magnetic head. This problem will now be described. As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied on the electrode film and patterned through a photolithography process to form a frame to be used for plating. The top pole layer is then formed by plating through the use of the electrode film previously formed as a seed layer.

However, there is a difference in height between the apex and the other part, such as 7 to 10 µm or more. The photoresist whose thickness is 3 to 4 µm is applied to cover the apex. If the photoresist thickness is required to be at least 3 µm on top of the apex, a photoresist film having a thickness of 8 to 10 µm or more, for example, is formed below the apex since the fluid photoresist goes downward.

To implement a recording track width of the submicron order as described above, it is required to form a frame pattern of the submicron order through the use of a photoresist film. Therefore, it is required to form a fine pattern of the submicron order through the use of a photoresist film having a thickness of 8 to 10 $\mu$m or more. However, it is extremely difficult to form a photoresist pattern having such a thickness into a reduced pattern width in a manufacturing process.

Furthermore, rays of light used for exposure of photolithography are reflected off the base electrode film as the seed layer. The photoresist is exposed to the reflected rays as well and the photoresist pattern may be out of shape. It is therefore impossible to obtain a sharp and precise photoresist pattern.

As thus described, it is difficult in prior art to fabricate the top pole layer with accuracy if the pole width of the submicron order is required.

Therefore, as described above with reference to the steps of the related-art example shown in FIG. 42A to FIG. 46A and FIG. 42B to FIG. 46B, a method has been applied, too, (as disclosed in Published Unexamined Japanese Patent Application Sho 62-245509 [1987] and Published Unexamined Japanese Patent Application Sho 60-10409 [1985]), in which the track width of 1.0 $\mu$m or less is obtained with the top pole tip 109 that is effective for making a narrow track of the recording head. The top pole layer 116 to be a yoke portion connected to the top pole tip 109 is then formed. In such a manner the ordinary top pole layer is divided into the top pole tip 109 and the top pole layer 116 to be the yoke portion. The top pole tip 109 of the submicron width that defines the track width is thereby formed on the flat surface on the recording gap layer 108.

However, the following problems are still found in such a thin-film magnetic head having a two-layer top pole layer that defines the track width.

The top pole layer 116 is aligned on top of the top pole tip 109 through alignment of photolithography. Therefore, if the top pole tip 109 and the top pole layer 116 are greatly shifted to one side when seen from the air bearing surface 120, writing could be performed on a side of the top pole layer 116 and the effective track width could be increased. As a result, so-called side write occurs in the thin-film magnetic head having the two-layer top pole layer, that is, data is written in a region where data is not supposed to be written.

Furthermore, a magnetic flux may saturate in the portion where the top pole tip 109 and the top pole layer 116 are in contact with each other since the top pole tip 109 and the top pole layer 116 are different in width. It is therefore impossible to improve the writing properties such as flux rise time.

In the thin-film magnetic head the throat height is defined by an end of the top pole tip 109 further from the air bearing surface 120. However, if the width of the pole tip 109 is reduced, rounded pattern edges are obtained through photolithography. Consequently, the throat height that is required to be precise is made uneven, and the yield is greatly reduced in the processing and lapping steps of the air bearing surface 120.

In the related-art head the coils 112 and 114 are formed after the MR element 105 is formed. Therefore, if the MR element 105 is a GMR element having a high sensitivity, in particular, the reading sensitivity of the MR element 105 could be reduced, due to the effect of heat treatment performed on the photoresist for making the coils 112 and 114 or the effect of water thereby produced.

Furthermore, a number of steps are required to complete the related-art head after the MR element 105 is formed. Therefore, if the MR element 105 is a GMR element having a plurality of very thin (about 1 to 5 nm) layers, in particular, damage of the MR element 105 such as static damage is likely to occur through handling and so on.

In prior art an overcoat layer of alumina, for example, whose thickness is about 30 to 40 $\mu$m is formed to protect the reproducing head and the recording head and to maintain the quality of the product in a step immediately before the completion of the mass-production process of the thin-film magnetic heads. Consequently, warpage of the substrate results due to the thick overcoat layer or many particles are generated when the thick layer is formed through sputtering. The property and yields of the thin-film magnetic heads are thereby reduced. In prior art it takes fifteen hours or more to form the alumina film of about 40 $\mu$m in thickness by sputtering. The cycle time of mass-production of the thin-film magnetic heads and the sputtering capability are therefore greatly limited.

OBJECTS AND SUMMARY OF THE INVENTION

It is a first object of the invention to provide a thin-film magnetic head and a method of manufacturing the same and a thin-film magnetic head material and a method of manufacturing the same for providing thin-film magnetic heads that meet specifications required by the customer in a short time and for improving yields of thin-film magnetic heads.

In addition to the first object, it is a second object of the invention to provide a thin-film magnetic head and a method of manufacturing the same and a thin-film magnetic head material and a method of manufacturing the same for reducing the track width of the recording head without reducing the performance characteristics and yields.

In addition to the first object, it is a third object of the invention to provide a thin-film magnetic head and a method of manufacturing the same and a thin-film magnetic head material and a method of manufacturing the same for preventing damage and a reduction in performance characteristics of the reproducing head.

In addition to the first object, it is a fourth object of the invention to provide a thin-film magnetic head and a method of manufacturing the same and a thin-film magnetic head material and a method of manufacturing the same for reducing the thickness of an overcoat layer.

A thin-film magnetic head of the invention comprises: a reproducing head including: a magnetoresistive element; and a first shield layer and a second shield layer for shielding the magnetoresistive element, portions of the first and second shield layers located on a side of a medium facing surface that faces toward a recording medium being opposed to each other with the magnetoresistive element in between; and a recording head including: a first magnetic layer and a second magnetic layer magnetically coupled to each other each of which includes at least one layer, the first and second magnetic layers including magnetic pole portions opposed to each other and placed in regions on a side of the medium facing surface; a gap layer placed between the pole portions of the first and second magnetic layers; and a thin-film coil at least part of which is placed between the first and second magnetic layers and insulated from the first and second magnetic layers. The second shield layer includes: a first portion placed in a region including a region facing the thin-film coil; a second portion connected to a surface of the first portion facing the coil and placed on a side of the first shield layer; and a third portion connected to the second portion and facing the first shield layer, the MR element being placed between the third portion and the first shield layer; and the second shield layer also functions as the first magnetic layer. The at least part of the thin-film coil is placed on a side of the second portion of the second shield layer.

A method of the invention is provided for manufacturing a thin-film magnetic head comprising: a reproducing head including: a magnetoresistive element; and a first shield layer and a second shield layer for shielding the magnetoresistive element, portions of the first and second shield layers located on a side of a medium facing surface that faces toward a recording medium being opposed to each other with the magnetoresistive element in between; and a recording head including: a first magnetic layer and a second magnetic layer magnetically coupled to each other each of which includes at least one layer, the first and second magnetic layers including magnetic pole portions opposed to each other and placed in regions on a side of the medium facing surface; a gap layer placed between the pole portions of the first and second magnetic layers; and a thin-film coil at least part of which is placed between the first and second magnetic layers and insulated from the first and second magnetic layers. The second shield layer includes: a first portion placed in a region including a region facing the thin-film coil; a second portion connected to a surface of the first portion facing the coil and placed on a side of the first shield layer; and a third portion connected to the second portion and facing the first shield layer, the MR element being placed between the third portion and the first shield layer; and the second shield layer also functions as the first magnetic layer. The at least part of the thin-film coil is placed on a side of the second portion of the second shield layer. The method includes the steps of: forming the first portion of the second shield layer; forming at least part of the thin-film coil such that the at least part of the coil is placed on the first portion and insulated from the first portion; forming the second portion of the second shield layer such that the second portion is located on the side of the at least part of the coil and connected to the surface of the first shield layer facing the coil; forming the first shield layer on a side of the second portion; forming the magnetoresistive element on an insulating film formed on the first shield layer; forming the third portion of the second shield layer on an insulating film formed on the magnetoresistive element; forming the gap layer on the third portion; and forming the second magnetic layer on the gap layer.

According to the thin-film magnetic head or the method of manufacturing the same of the invention, a thin-film magnetic head material comprising the first shield layer, the first and second portions of the second shield layer, and at least part of the thin-film coil is manufactured. In response to the customer's requests, the third portion of the second shield layer, the magnetoresistive element, and the second magnetic layer may be formed in the material.

According to the head or the method of the invention, the second magnetic layer may be made up of a single layer.

According to the head or the method, the second shield layer may further include a fourth portion that is connected to a surface of the third portion facing the gap layer and defines a throat height. In this case, the second magnetic layer may be made of a single flat layer.

According to the head or the method, the thin-film coil may include a second layer portion located on a side of the third portion of the second shield layer.

According to the head or the method, a surface facing the magnetoresistive element of each of the first shield layer, the second portion of the second shield layer, and the at least part of the coil may be flattened.

According to the head or the method, the thin-film coil may include a second layer portion located on a side of the fourth portion of the second shield layer. In this case, an insulating layer may be further provided on a side of the third portion of the second shield layer, wherein a surface facing the second layer portion of each of the third portion and the insulating layer is flattened.

According to the head or the method, an insulating layer may be further provided between the gap layer and the second magnetic layer and defines a throat height.

According to the head or the method, a first insulating layer may be further provided along a surface of the thin-film coil and a second insulating layer may be provided to cover the first insulating layer.

According to the head or the method, an insulating layer may be further provided along surfaces of the first portion and the second portion of the second shield layer, wherein the first shield layer is separated from the second portion by the insulating layer.

According to the head or the method, an insulating layer made of an inorganic material may be further provided to cover the thin-film coil.

According to the head or the method, an insulating layer covering the first portion of the second shield layer may be further provided and a surface of the insulating layer facing the coil may be flattened.

According to the head or the method, an insulating layer may be provided, the insulating layer having a concave portion in a region corresponding to the first portion of the second shield layer, wherein the first portion is formed in the concave portion.

A thin-film magnetic head material of the invention is used for manufacturing a thin-film magnetic head comprising: a reproducing head including: a magnetoresistive element; and a first shield layer and a second shield layer for shielding the magnetoresistive element, portions of the first and second shield layers located on a side of a medium facing surface that faces toward a recording medium being opposed to each other with the magnetoresistive element in between; and a recording head including: a first magnetic layer and a second magnetic layer magnetically coupled to each other each of which includes at least one layer, the first and second magnetic layers including magnetic pole portions opposed to each other and placed in regions on a side of the medium facing surface; a gap layer placed between the pole portions of the first and second magnetic layers; and a thin-film coil at least part of which is placed between the first and second magnetic layers and insulated from the first and second magnetic layers. The second shield layer includes: a first portion placed in a region including a region facing the thin-film coil; a second portion connected to a surface of the first portion facing the coil and placed on a side of the first shield layer; and a third portion connected to the second portion and facing the first shield layer, the MR element being placed between the third portion and the first shield layer; and the second shield layer also functions as the first magnetic layer. The at least part of the thin-film coil is placed on a side of the second portion of the second shield layer. The thin-film magnetic head material comprises: the first shield layer; the first portion of the second shield layer; the second portion of the second shield layer; and the at least part of the thin-film coil located on the side of the second portion.

A method of the invention is provided for manufacturing a thin-film magnetic head material used for manufacturing a thin-film magnetic head comprising: a reproducing head including: a magnetoresistive element; and a first shield layer and a second shield layer for shielding the magnetoresistive element, portions of the first and second shield layers located on a side of a medium facing surface that faces toward a recording medium being opposed to each other with the magnetoresistive element in between; and a recording head including: a first magnetic layer and a second magnetic layer magnetically coupled to each other each of which includes at least one layer, the first and second magnetic layers including magnetic pole portions opposed to each other and placed in regions on a side of the medium facing surface; a gap layer placed between the pole portions of the first and second magnetic layers; and a thin-film coil at least part of which is placed between the first and second magnetic layers and insulated from the first and second magnetic layers. The second shield layer includes: a first portion placed in a region including a region facing the thin-film coil; a second portion connected to a surface of the first portion facing the coil and placed on a side of the first shield layer; and a third portion connected to the second portion and facing the first shield layer, the MR element being placed between the third portion and the first shield layer; and the second shield layer also functions as the first magnetic layer. The at least part of the thin-film coil is placed on a side of the second portion of the second shield layer. The method includes the steps of: forming the first portion of the second shield layer; forming at least part of the thin-film coil such that the at least part of the coil is placed on the first portion and insulated from the first portion; forming the second portion of the second shield layer such that the second portion is located on the side of the at least part of the coil and connected to the surface of the first shield layer facing the coil; and forming the first shield layer on a side of the second portion.

According to the thin-film magnetic head material or the method of manufacturing the same of the invention, the thin-film magnetic head material comprising the first shield layer, the first and second portions of the second shield layer, and at least part of the thin-film coil is manufactured. In response to the customer's requests, the third portion of the second shield layer, the magnetoresistive element, and the second magnetic layer may be formed in the material.

According to the head material or the method, a surface facing the magnetoresistive element of each of the first shield layer, the second portion of the second shield layer, and the at least part of the coil may be flattened.

According to the head material or the method, a first insulating layer may be further provided along a surface of the thin-film coil and a second insulating layer may be provided to cover the first insulating layer.

According to the head material or the method, an insulating layer may be further provided along surfaces of the first portion and the second portion of the second shield layer, wherein the first shield layer is separated from the second portion by the insulating layer.

According to the head material or the method, an insulating layer made of an inorganic material may be further provided to cover the thin-film coil.

According to the head material or the method, an insulating layer covering the first portion of the second shield layer may be further provided and a surface of the insulating layer facing the coil may be flattened.

According to the head material or the method, an insulating layer may be provided, the insulating layer having a concave portion in a region corresponding to the first portion of the second shield layer, wherein the first portion is formed in the concave portion.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 6A and FIG. 6B are cross sections for illustrating a step that follows FIG. 5A and FIG. 5B.

FIG. 7A and FIG. 7B are cross sections for illustrating a step that follows FIG. 6A and FIG. 6B.

FIG. 20A and FIG. 20B are cross sections for illustrating a step in a method of manufacturing a thin-film magnetic head of a third embodiment of the invention.

FIG. 21A and FIG. 21B are cross sections for illustrating a step that follows FIG. 20A and FIG. 20B.

FIG. 22A and FIG. 22B are cross sections for illustrating a step that follows FIG. 21A and FIG. 21B.

FIG. 29A and FIG. 29B are cross sections for illustrating a step in a method of manufacturing a thin-film magnetic head of a sixth embodiment of the invention.

FIG. 30A and FIG. 30B are cross sections for illustrating a step that follows FIG. 29A and FIG. 29B.

FIG. 31A and FIG. 31B are cross sections for illustrating a step that follows FIG. 30A and FIG. 30B.

FIG. 31A and FIG. 32B are cross sections for illustrating a step that follows FIG. 31A and FIG. 31B.

FIG. 38A and FIG. 38B are cross sections for illustrating a step in a method of manufacturing a thin-film magnetic head of a related art.

FIG. 39A and FIG. 39B are cross sections for illustrating a step that follows FIG. 38A and FIG. 38B.

FIG. 40A and FIG. 40B are cross sections for illustrating a step that follows FIG. 39A and FIG. 39B.

FIG. 41A and FIG. 41B are cross sections for illustrating a step that follows FIG. 40A and FIG. 40B.

FIG. 42A and FIG. 42B are cross sections for illustrating a step that follows FIG. 41A and FIG. 41B.

FIG. 43A and FIG. 43B are cross sections for illustrating a step that follows FIG. 42A and FIG. 42B.

FIG. 44A and FIG. 44B are cross sections for illustrating a step that follows FIG. 43A and FIG. 43B.

FIG. 45A and FIG. 45B are cross sections for illustrating a step that follows FIG. 44A and FIG. 44B.

FIG. 46A and FIG. 46B are cross sections for illustrating a step that follows FIG. 45A and FIG. 45B.

DETAILED DESCRIPTION OF THE PREFERRED EMBODIMENTS

Figures 4A, 4B:
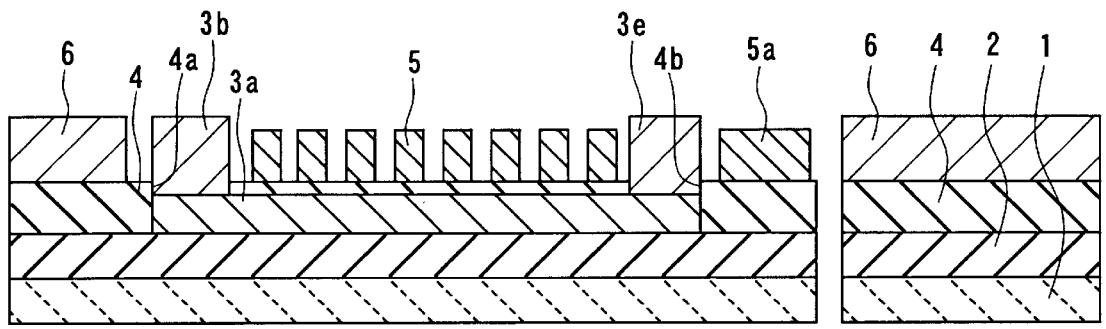
FIG. 4A and FIG. 4B are cross sections for illustrating a step that follows FIG. 3A and FIG. 3B.

Preferred embodiment of the invention will now be described in detail with reference to the accompanying drawings.

[First Embodiment]

Reference is now made to FIG. 1A to FIG. 11A, FIG. 1B to FIG. 11B, and FIG. 12 to FIG. 17 to describe a composite thin-film magnetic head and a method of manufacturing the same of a first embodiment of the invention. FIG. 1A to FIG. 11A and FIG. 1B to FIG. 11B are cross sections for describing the method of manufacturing the thin-film magnetic head of the embodiment. FIG. 1A to FIG. 11A are cross sections each orthogonal to the air bearing surface. FIG. 1B to FIG. 11B are cross sections of the pole portion of the head parallel to the air bearing surface. FIG. 12 to FIG. 17 are top views for describing the method of manufacturing the thin-film magnetic head of the embodiment. The following description applies to a magnetic head material and a method of manufacturing the same of the first embodiment, too.

In the method of the embodiment, as shown in FIG. 1A and FIG. 1B, an insulating layer 2 made of alumina ($Al_2O_3$), for example, of about 5 µm in thickness is deposited on a substrate 1 made of aluminum oxide and titanium carbide ($Al_2O_3$—TiC), for example.

Next, on the insulating layer 2, a first portion 3a of a top shield layer-cum-bottom pole layer (called a top shield layer in the following description) is selectively formed through plating, for example. The first portion 3a is made of a magnetic material such as Permalloy (NiFe) and has a thickness of about 3 µm. The top shield layer is used for both a reproducing head and a recording head. The first portion 3a is located in a region including a region facing a thin-film coil described later. Next, an insulating layer 4 made of an inorganic material such as alumina and having a thickness of about 4 to 5 µm is formed over the entire surface.

Next, as shown in FIG. 2A and FIG. 2B, the insulating layer 4 is polished through CMP or mechanical polishing, for example, and flattened such that a portion of the insulating layer 4 located on top of the first portion 3a is about 0.3 to 0.4 µm in thickness.

Next, as shown in FIG. 3A and FIG. 3B, on the portion of the insulating layer 4 located on top of the first portion 3a, a thin-film coil 5 made of copper (Cu), for example, and having a thickness of about 1 to 2 µm is formed through plating, for example, for the recording head. Numeral 5a in the drawings indicates a terminal portion of the coil 5. Although not shown, a seed layer having a thickness of tens of nanometers, for example, is made on the insulating layer 4 if the coil 5 is formed through plating. The seed layer may be made of Cu, NiFe, TiW, TiN or Mo.

Next, as shown in FIG. 4A and FIG. 4B, contact holes 4a and 4b are formed through selectively etching portions of the insulating layer 4 near an air-bearing-surface-side end (the left side of FIG. 4A) of the first portion 3a and near the other end. Alternatively, the above-described seed layer may be formed after forming the contact holes 4a and 4b, and the thin-film coil 5 may be then formed.

Next, on a portion of the insulating layer 4 closer to the air bearing surface than the first portion 3a, a bottom shield layer 6 made of a magnetic material such as Permalloy (NiFe) is formed for the reproducing head. At the same time, a second portion 3b of the top shield layer is formed in the contact hole 4a on the first portion 3a. A magnetic layer 3e for making a magnetic path is formed in the contact hole 4b on the first portion 3a. The second portion 3b and the magnetic layer 3e are made of the same material as the bottom shield layer 6. The bottom shield layer 6, the second portion 3b and the magnetic layer 3e are formed through plating, for example, and have a thickness of about 3 to 3.5 µm.

Figures 5A, 5B:
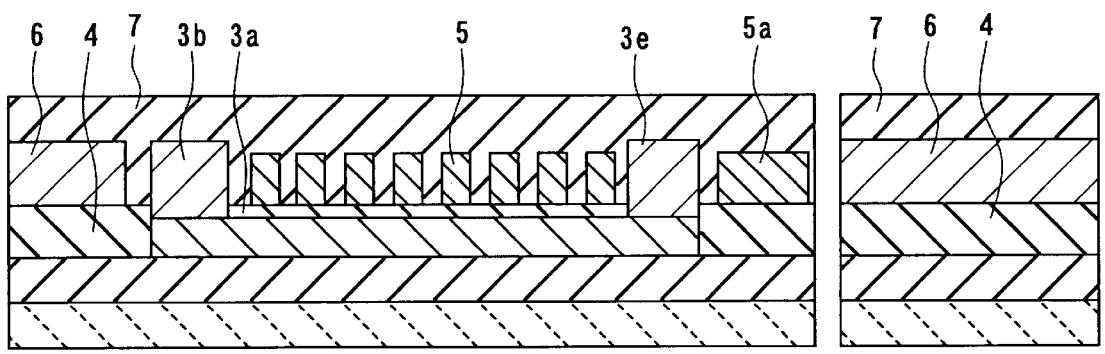
FIG. 5A and FIG. 5B are cross sections for illustrating a step that follows FIG. 4A and FIG. 4B.

Next, as shown in FIG. 5A and FIG. 5B, an insulating layer 7 made of an inorganic material such as alumina and having a thickness of about 4 to 5 µm is formed over the entire surface.

Figure 12:
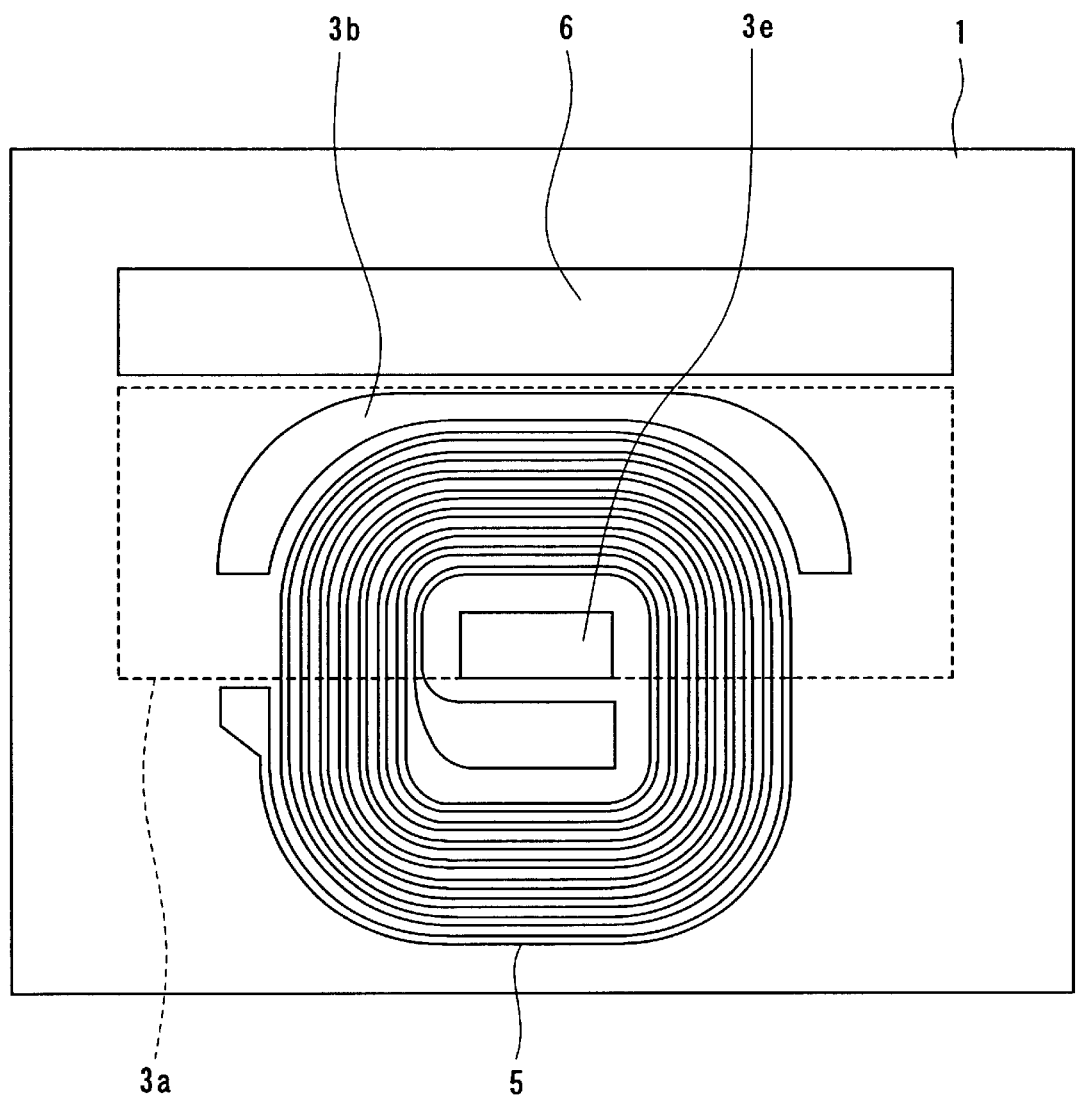
FIG. 12 is a top view of the thin-film magnetic head of the first embodiment in the state in one of the manufacturing steps.

Next, as shown in FIG. 6A and FIG. 6B, the insulating layer 7 is polished to the surfaces of the bottom shield layer 6, the second portion 3b and the magnetic layer 3e through CMP or mechanical polishing, for example, and flattened. FIG. 12 is a top view illustrating the state shown in FIG. 6A and FIG. 6B.

Figure 13:
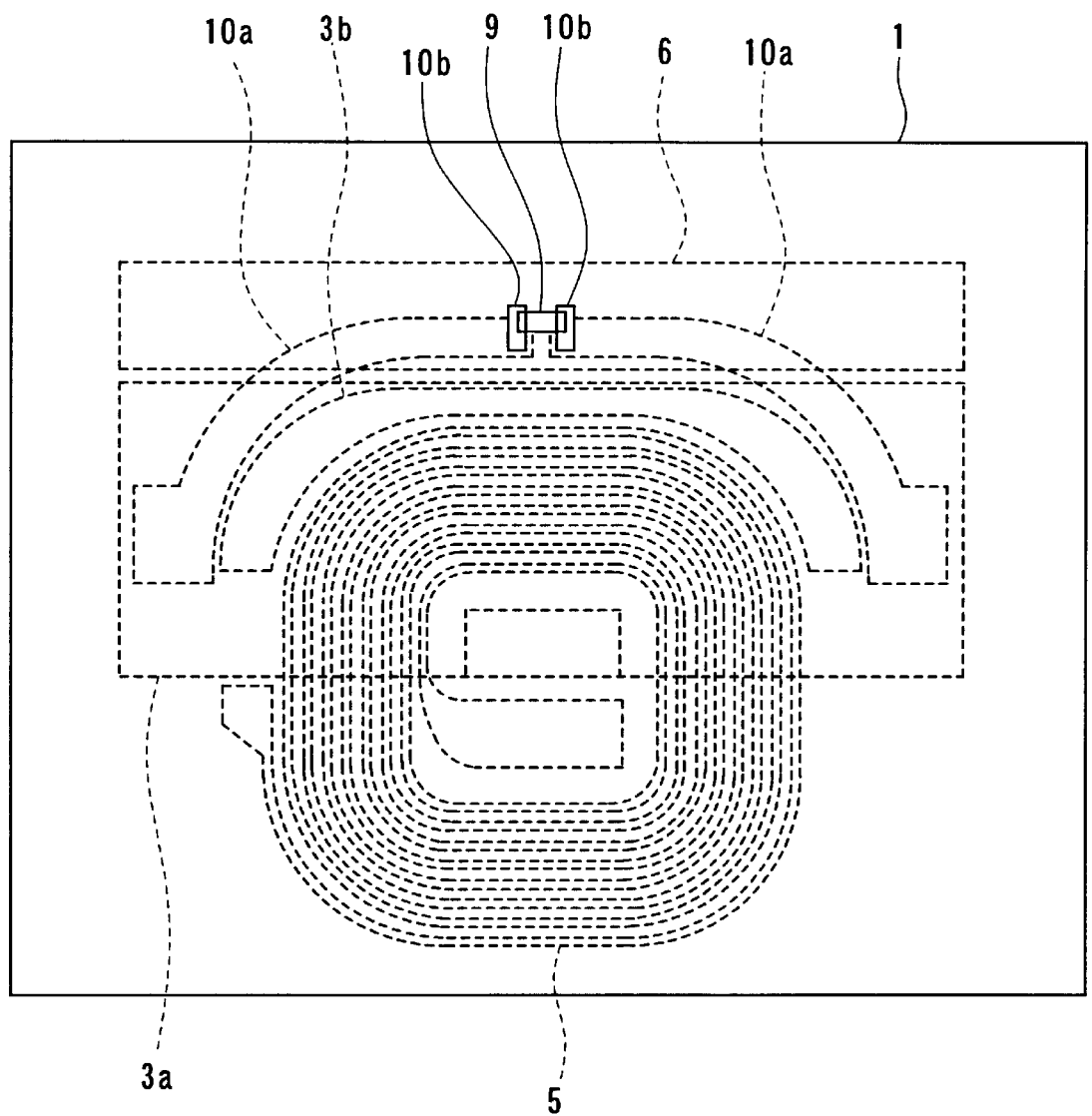
FIG. 13 is a top view of the thin-film magnetic head of the first embodiment in the state in one of the manufacturing steps.

Next, as shown in FIG. 13 that will be referred to in the following description, a pair of conductive layers 10a made of copper (Cu), for example, are formed to be insulated from the bottom shield layer 6 and the second portion 3b of the top shield layer. The conductive layers 10a are to be electrodes (leads) connected to an MR element described later.

Next, as shown in FIG. 7A and FIG. 7B, an insulating material such as aluminum nitride or alumina is deposited through sputtering, for example, to a thickness of 50 nm, for example, over the entire surface. A bottom shield gap film 8 as an insulating film is thereby formed.

The intermediate product in the state shown in FIG. 6A and FIG. 6B or the intermediate product shown in FIG. 6A and FIG. 6B to which the bottom shield gap film 8 is added is a thin-film magnetic head material of the embodiment.

Next, an MR element 9 for reproduction having a thickness of tens of nanometers is formed on the bottom shield gap film 8. The MR element 9 may be formed through selectively etching an MR film formed through sputtering. The MR element 9 may be an element utilizing a magneto-sensitive film that exhibits magnetoresistivity, such as a tunnel magnetoresistive (TMR) element, an AMR element, or a GMR element.

Next, a pair of electrode layers 10b having a thickness of tens to hundreds of nanometers are formed through sputtering, for example, on the bottom shield gap film 8. The electrode layers 10b are electrically connected to the MR element 9 and the conductive layers 10a. FIG. 13 is a top view illustrating this state.

Next, an insulating material such as alumina or diamond-like carbon (DLC) is deposited through sputtering, for example, to a thickness of tens of nanometers over the entire surface. A top shield gap film 11 as an insulating film is thus formed. The MR element 9 is embedded in the shield gap films 8 and 11.

Figures 8A, 8B:
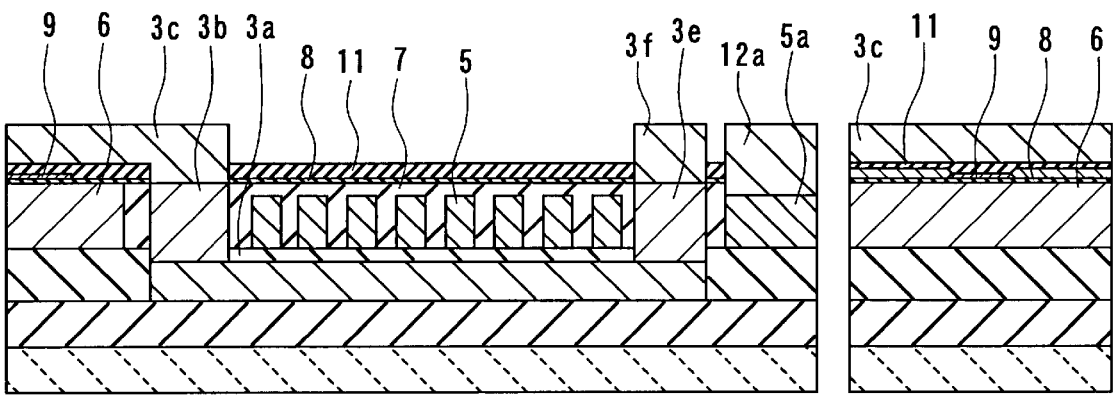
FIG. 8A and FIG. 8B are cross sections for illustrating a step that follows FIG. 7A and FIG. 7B.

Next, as shown in FIG. 8A and FIG. 8B, portions of the shield gap films 8 and 11 are selectively removed through dry etching with a photoresist pattern as a mask. Contact holes are thereby formed in the portions on top of the second portion 3b of the top shield layer, on top of the magnetic layer 3e, and on top of the terminal portion 5a of the thin-film coil 5. A portion of the insulating layer 7 on top of the terminal portion 5a is removed, too, for making the contact hole in the portion on top of the terminal portion 5a. Dry etching may be reactive ion etching (RIE) using a $BCl_3$ base or $CF_4$ base gas. Alternatively, the above-stated contact holes may be formed through liftoff.

Figure 14:
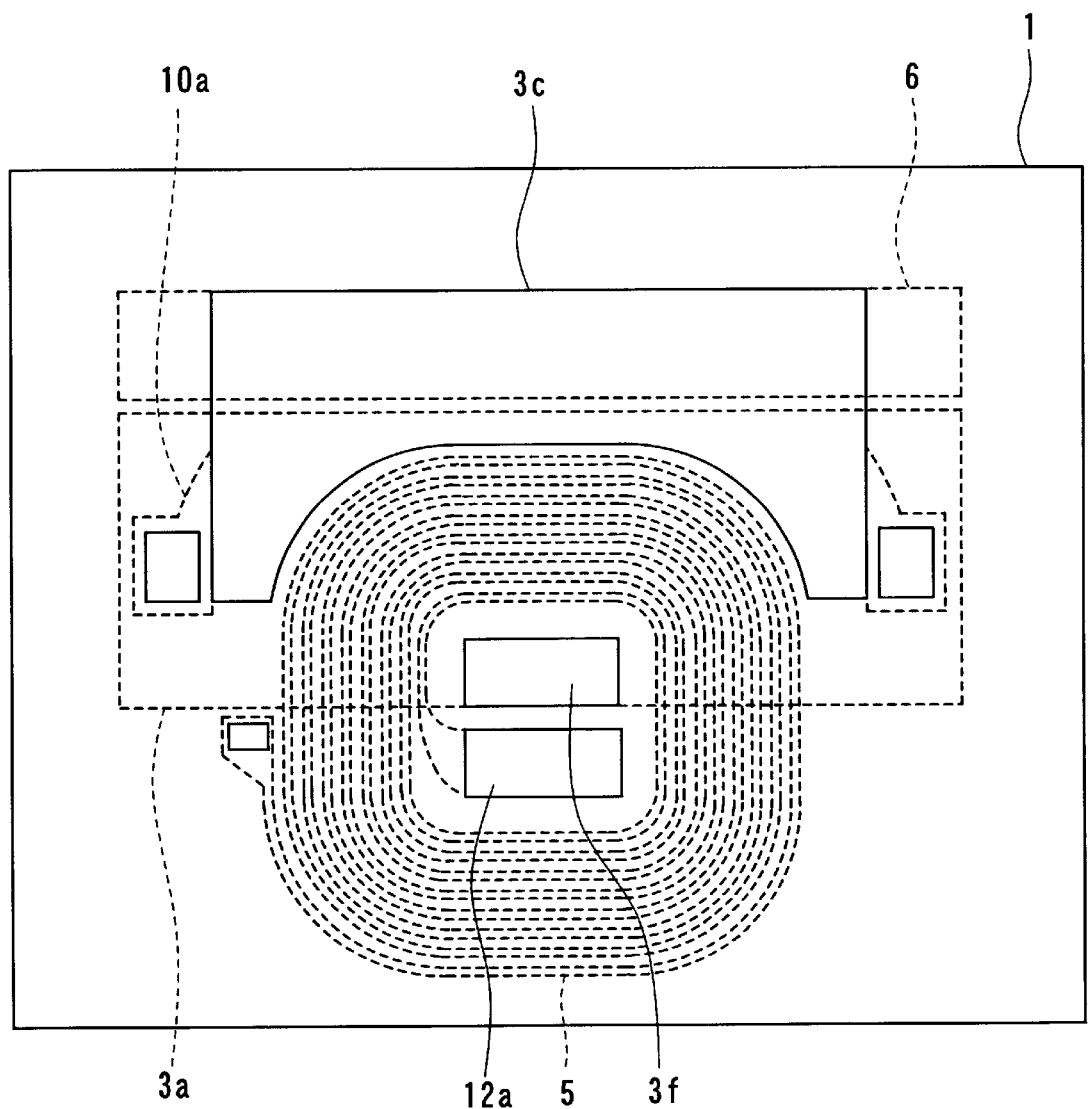
FIG. 14 is a top view of the thin-film magnetic head of the first embodiment in the state in one of the manufacturing steps.

Next, a third portion 3c of the top shield layer made of a magnetic material such as Permalloy (NiFe) is formed through plating, for example. The third portion 3c extends from the top of the second portion 3b to the air-bearing-surface-side end. The third portion 3c is connected to the second portion 3b through the contact hole. At the same time as the third portion 3c is formed, a magnetic layer 3f and a terminal portion 12a made of the same material as the third portion 3c are formed on top of the magnetic layer 3e and the terminal portion 5a. The third portion 3c, the magnetic layer 3f and the terminal portion 12a each have a thickness of about 1 to 2 μm. FIG. 14 is a top view illustrating the state shown in FIG. 8A and FIG. 8B.

Figures 9A, 9B:
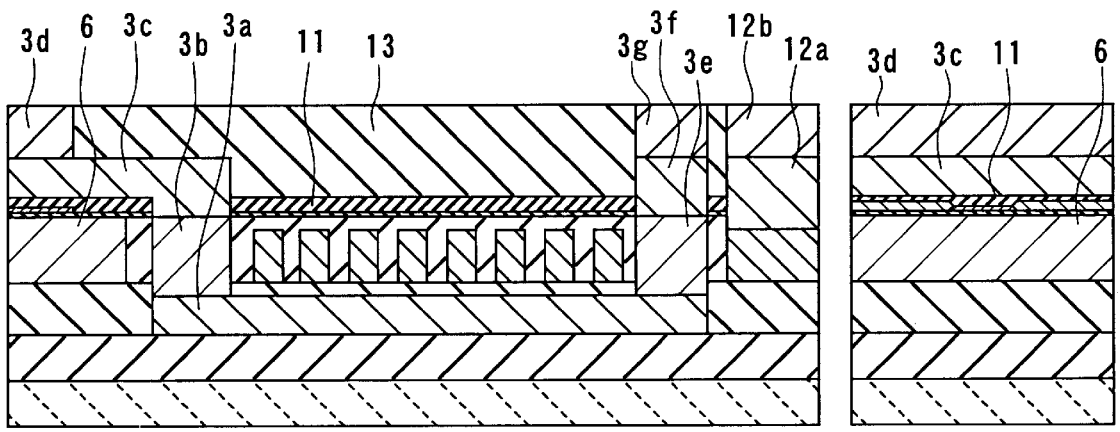
FIG. 9A and FIG. 9B are cross sections for illustrating a step that follows FIG. 8A and FIG. 8B.

Next, as shown in FIG. 9A and FIG. 9B, a fourth portion 3d of the top shield layer made of a magnetic material is formed through plating, for example, on the third portion 3c.

The fourth portion 3d extends from the air-bearing-surface-side end to a specific position to define the throat height. The magnetic material used for the fourth portion 3d is preferably a high saturation flux density material such as NiFe (50 weight % Ni and 50 weight % Fe). At the same time as the fourth portion 3d is formed, a magnetic layer 3g and a terminal portion 12b made of the same material as the fourth portion 3d are formed on top of the magnetic layer 3f and the terminal portion 12a, respectively. The fourth portion 3d, the magnetic layer 3g and the terminal portion 12b each have a thickness of about 1.5 to 2.5 μm.

Next, an insulating layer 13 made of an inorganic material such as alumina or silicon dioxide and having a thickness of 4 to 5 μm is formed over the entire surface. Next, the entire surface is polished through CMP or mechanical polishing, for example, and flattened so that the surfaces of the fourth portion 3d of the top shield layer, the magnetic layer 3g and the terminal portion 12b are exposed.

Figures 10A, 10B:
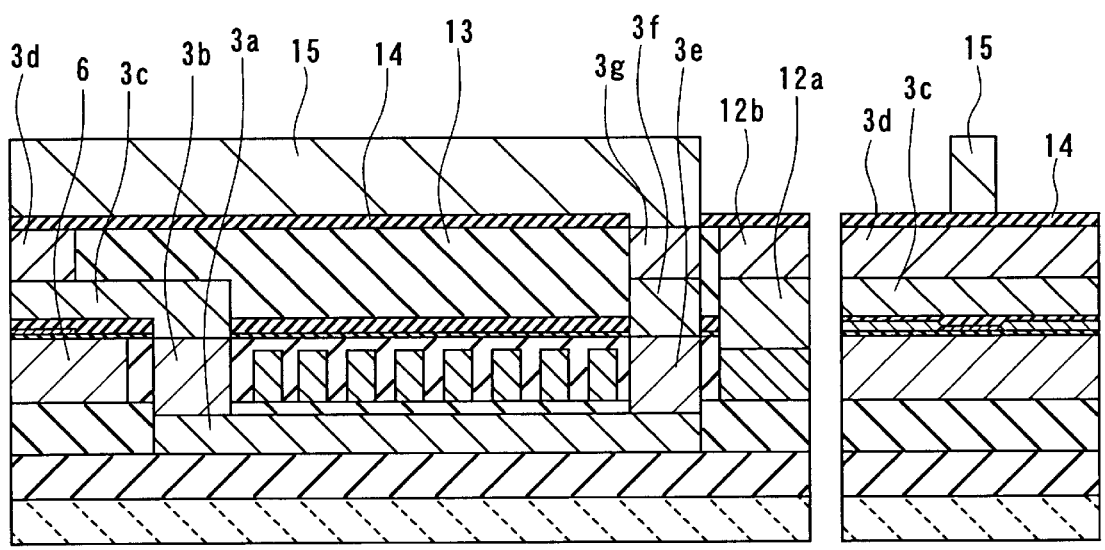
FIG. 10A and FIG. 10B are cross sections for illustrating a step that follows FIG. 9A and FIG. 9B.
Figure 15:
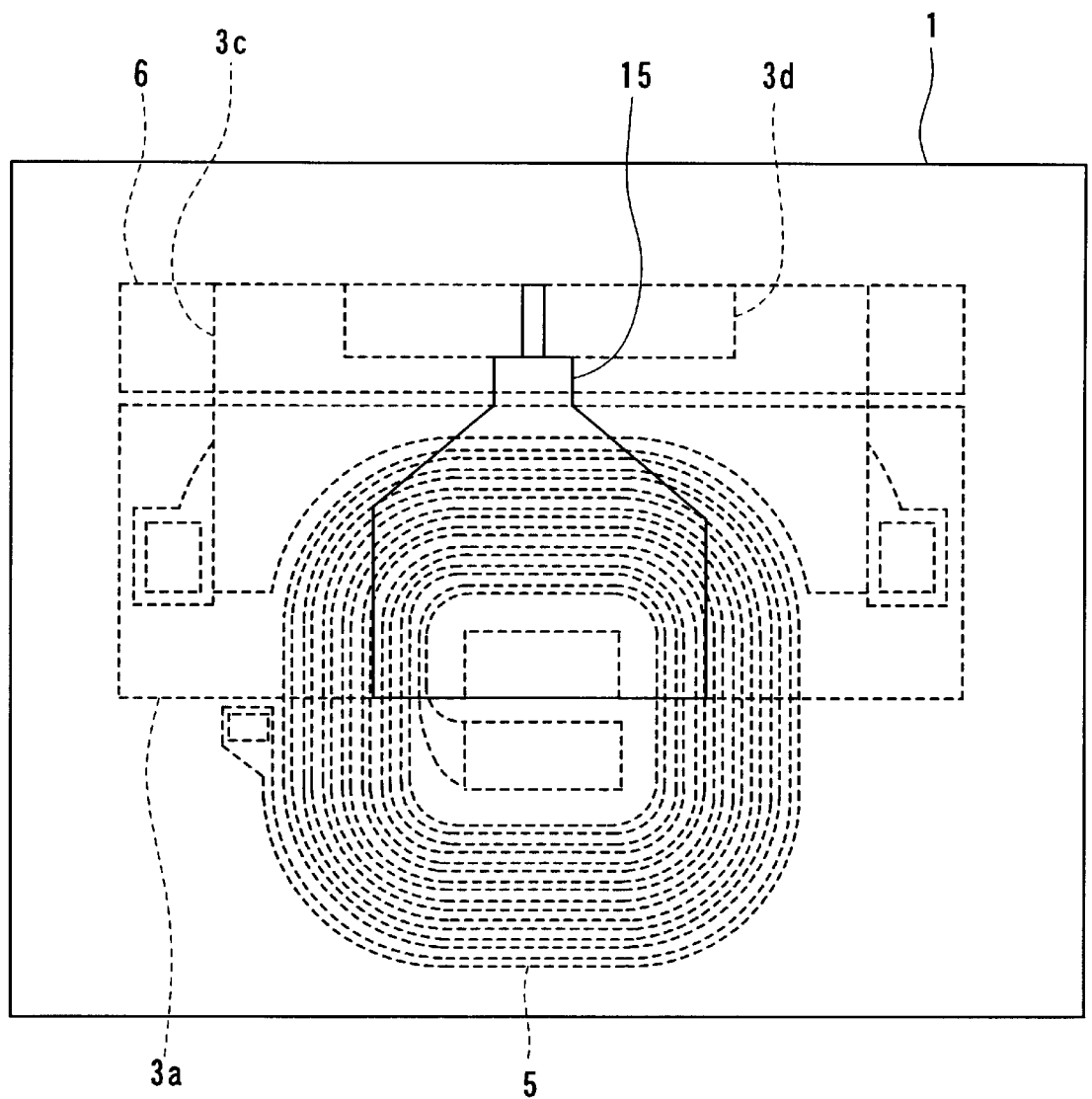
FIG. 15 is a top view of the thin-film magnetic head of the first embodiment in the state in one of the manufacturing steps.

Next, as shown in FIG. 10A and FIG. 10B, a recording gap layer 14 made of an insulating film such as an alumina film and having a thickness of about 150 to 250 nm, for example, is formed over the entire surface. Next, a portion of the recording gap layer 14 on top of the magnetic layer 3g is selectively removed to form a contact hole for making the magnetic path. FIG. 15 is a top view illustrating the state shown in FIG. 10A and FIG. 10B.

Next, on the recording gap layer 14, a top pole layer 15 having a thickness of about 3 μm is formed through plating, for example. The top pole layer 15 defines the track width of the induction-type recording head. The top pole layer 15 may be made of NiFe (80 weight % Ni and 20 weight % Fe) or a high saturation flux density material such as NiFe (45 weight % Ni and 55 weight % Fe). The top pole layer 15 is connected to the magnetic layer 3g through the contact hole formed in the recording gap layer 14.

Figures 11A, 11B:
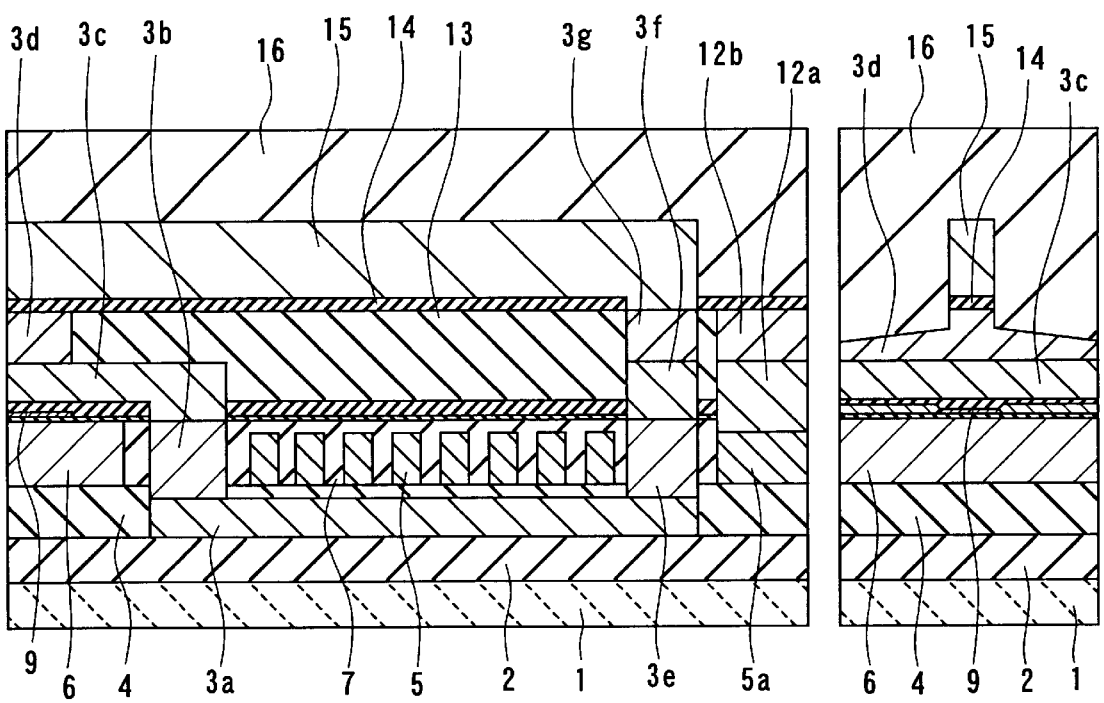
FIG. 11A and FIG. 11B are cross sections of the thin-film magnetic head of the first embodiment of the invention.

Next, as shown in FIG. 11A and FIG. 11B, portions of the recording gap layer 14 on both sides of the top pole layer 15 are removed through dry etching. The exposed fourth portion 3d of the top shield layer is then etched through ion milling, for example, by about 0.3 to 0.5 μm, for example, with the top pole layer 15 as a mask so as to form a trim structure.

Next, an overcoat layer 16 of alumina, for example, whose thickness is about 20 to 30 μm is formed to cover the entire surface. The top surface of the overcoat layer 16 is then flattened. Pads (not shown) for electrodes connected to the reproducing head and recording head are formed on the overcoat layer 16. Finally, machine processing of the slider is performed and the air bearing surface of the recording head and the reproducing head is formed. The thin-film magnetic head is thus completed. FIG. 11A and FIG. 11B illustrate the complete head.

In this embodiment the bottom shield layer 6 corresponds to a first shield layer of the invention. The top shield layer including the first portion 3a to the fourth portion 3d corresponds to a second shield layer of the invention. Since the top shield layer functions as the bottom pole layer as well, the top shield layer corresponds to a first magnetic layer of the invention, too. The top pole layer 15 corresponds to a second magnetic layer of the invention.

In the embodiment the bottom shield layer 6 and the top shield layer may be made of NiFe (80 weight % Ni and 20 weight % Fe) or a high saturation flux density material such as NiFe (50 weight % Ni and 50 weight % Fe), Sendust, FeN or a compound thereof, or an amorphous of Fe—Co—Zr.

Figure 16:
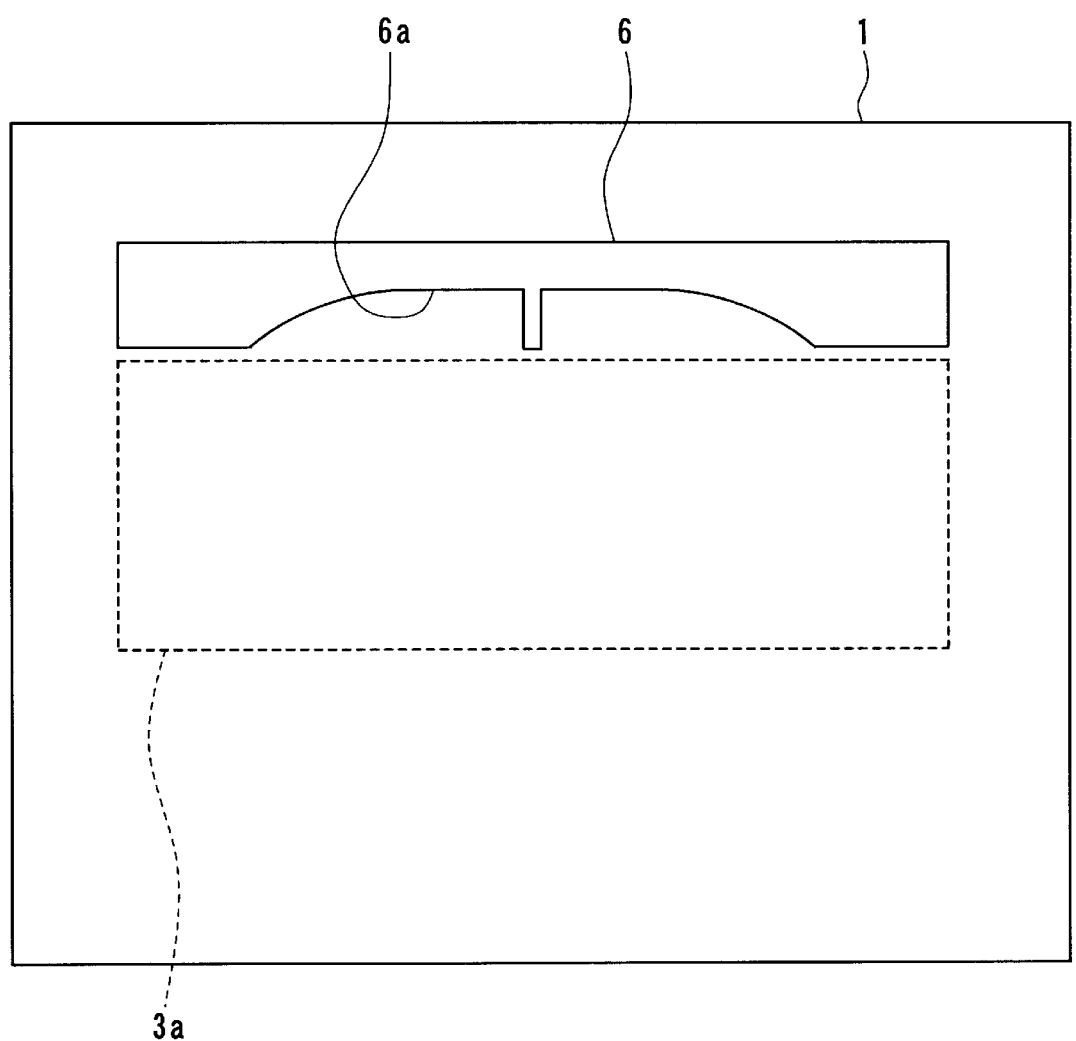
FIG. 16 is a top view for describing a modification example of the method of manufacturing the thin-film magnetic head of the first embodiment.
Figure 17:
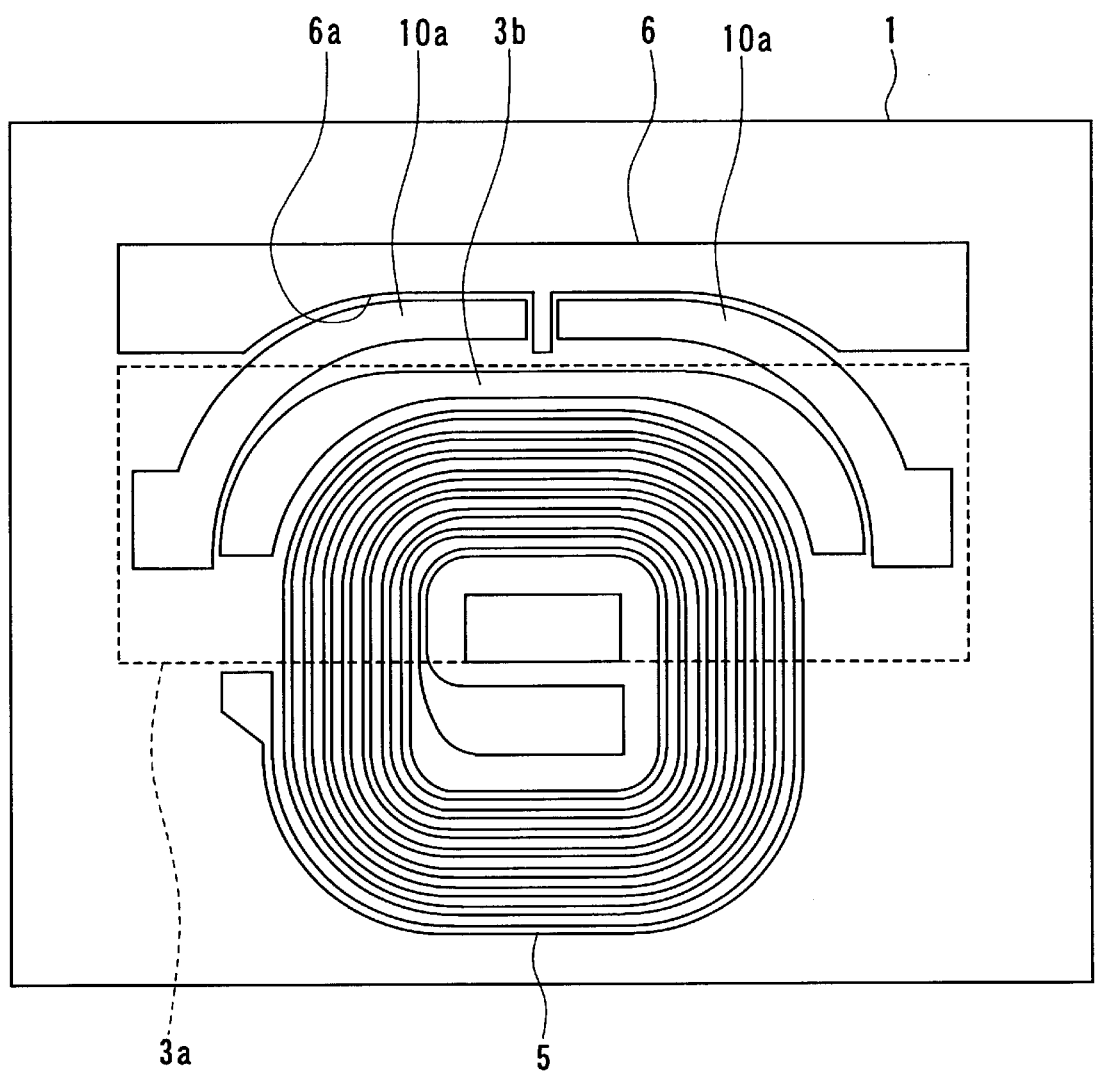
FIG. 17 is a top view for describing the modification example of the method of manufacturing the thin-film magnetic head of the first embodiment.

FIG. 16 and FIG. 17 are top views for illustrating a modification example of the method of manufacturing the thin-film magnetic head of the embodiment. In this example, as shown in FIG. 16, a groove 6a is formed in the portion where the conductive layers 10a are located in the step of forming the bottom shield layer 6. In the step of forming the thin-film coil 5, the conductive layers 10a are formed at the same time, as shown in FIG. 17. Portions of the conductive layers 10a are placed in the groove 6a while insulated from the bottom shield layer 6.

As thus described, the thin-film magnetic head of the embodiment comprises the reproducing head and the recording head. The reproducing head includes the MR element 9 and the bottom shield layer 6 and the top shield layer for shielding the MR element 9. Portions of the bottom shield layer 6 and the top shield layer on a side of the medium facing surface (air bearing surface) facing toward a recording medium are opposed to each other while the MR element 9 is placed between the portions of the bottom shield layer 6 and the top shield layer. The recording head includes the bottom pole layer (top shield layer) and the top pole layer 15 magnetically coupled to each other each of which includes at least one layer. The bottom pole layer and the top pole layer 15 include pole portions opposed to each other and located in regions on a side of the medium facing surface. The recording head further includes: the recording gap layer 14 placed between the pole portion of the bottom pole layer and the pole portion of the top pole layer 15; and the thin-film coil 5 at least part of which is placed between the bottom pole layer and the top pole layer 15, the at least part of the coil 5 being insulated from the bottom pole layer and the top pole layer 15.

In the embodiment the top shield layer includes: the first portion 3a placed in a region including a region facing the thin-film coil 5; the second portion 3b placed on a side of the bottom shield layer 6 and connected to a surface of the first portion 3a facing the coil 5; the third portion 3c connected to the second portion 3b and facing the bottom shield layer 6 with the MR element 9 in between; and the fourth portion 3d that defines the throat height, being connected to a surface of the third portion 3c facing the recording gap layer 14. The thin-film coil 5 is formed on a side of the second portion 3b of the top shield layer on top of the first portion 3a while the insulating layer 4 is placed between the first portion 3a and the coil 5.

The thin-film magnetic head material of the embodiment comprises: the bottom shield layer 6; the first portion 3a and the second portion 3b of the top shield layer; and the thin-film coil 5.

The effects of the embodiment of the invention will now be described. Many customers of thin-film magnetic heads order the track width of a reproducing head and the throat height and the track width of a recording head that suit their own products. However, if thin-film magnetic heads that meet the specifications a customer requires are manufactured after an order is received, it is difficult to supply the products in a short time after the receipt of the order.

According to the embodiment, as shown in FIG. 6A and FIG. 6B, the thin-film magnetic head materials each including the thin-film coil 5 are fabricated through the common steps It takes a relatively short time to perform the steps that follow the formation of the thin-film magnetic head materials. In addition, it is possible to inspect the thin-film magnetic head materials and remove nonconforming ones.

Therefore, according to the embodiment, the intermediate product, that is, the thin-film magnetic head material, having gone through the manufacturing steps as far as the step of forming the coil 5 may be mass-produced so that many intermediate products in stock are obtained. Such intermediate products in stock may be increased so that they are plentiful enough to be supplied to customers. The specifications of the thin-film magnetic heads may be then determined to meet different customers' demands. Therefore, the embodiment allows the appropriate number of intermediate products in stock to be obtained. Such intermediate products have gone through 60 percent or more of the entire manufacturing steps and many of them have passed an inspection as conforming products. It is therefore possible to produce thin-film magnetic heads that meet the specifications required by the customer in a short time after receipt of an order. As a result, the cycle time from receipt of a customer's order to completion and shipment of thin-film magnetic heads may be two weeks or less, according to the embodiment, which is shorter than twenty to forty days, for example, required in prior-art methods.

According to the embodiment, nonconforming intermediate products have been already eliminated so that it is possible to make conforming intermediate products into complete products as soon as possible in accordance with customers' demands. High quality of the products that is not obtained by prior-art techniques is therefore achieved and the yields of the finished products improve.

According to the embodiment, it is possible to respond to the customer's demand immediately even if it is changed in a short time. It is therefore possible to prevent products from being wasted.

According to the embodiment, intermediate products may be inspected so that the manufacturing steps that follow do not need to be performed on nonconforming products. As a result, manufacturing costs of the thin-film magnetic heads are reduced, compared to prior art.

According to the embodiment, inspections may be performed on both intermediate products and complete thin-film magnetic heads. Extremely high quality products are thereby assured.

According to the embodiment, inspections may be performed on both intermediate products and complete thin-film magnetic heads. As a result, it is easy to detect a manufacturing step with a problem and to immediately improve such a step. It is thereby possible to prevent a more serious problem. According to the embodiment, the thin-film coil 5 is formed on a side of the second portion 3b of the top shield layer on top of the first portion 3a while the insulating layer 4 is placed between the first portion 3a and the coil 5. The throat height is defined by the fourth portion 3d of the top shield layer (bottom pole layer). Therefore, no apex portion exists. As a result, according to the embodiment, the top pole layer 15 that defines the track width of the recording head is formed on the flat surface. It is thereby possible to achieve a track as narrow as the submicron order. Recording density is thereby increased and the performance of the recording head is improved.

According to the embodiment, the top pole layer 15 is not made of two layers of a top pole tip and a yoke portion but made of the single flat layer. It is therefore impossible that the yoke portion greater than the top pole tip in width is exposed in the air bearing surface. As a result, the embodiment prevents a problem that the effective track width increases or data is written in a region on a recording medium where data is not supposed to be written.

According to the embodiment, it is impossible that a magnetic flux saturates in a portion where two layers of the top pole layer are in contact with each other, which is a problem that arises if the top pole layer is made up of two layers. As a result, writing characteristics such as flux rise time are improved.

According to the embodiment, the fourth portion 3d of the top shield layer (top pole layer) that defines the throat height is provided, in addition to the top pole layer 15 that defines the track width of the recording head. As a result, the fourth portion 3d is formed with precision even if the track width of the recording head is shortened. The throat height is thus defined with precision.

According to the embodiment, the MR element 9 is formed after the coil 5 is formed. It is therefore possible to prevent a reduction in the property of the MR element 9 due to the influence of heat treatment performed on the photoresist when the coil 5 is formed and the influence of water thereby generated and so on. This preventing effect is particularly effective when the MR element 9 is a sensitive GMR or TMR element.

According to the embodiment, the number of manufacturing steps that follow the formation of the MR element 9 is reduced, compared to prior-art methods. It is therefore possible to greatly reduce breakage such as static damage of the MR element 9 caused by handling and so on. This effect is particularly effective when the MR element 9 is a GMR or TMR element made of layers of a plurality of extremely thin (about 1 to 5 nm) films. In the embodiment, the surface of the top pole layer 15 below the overcoat layer 16 is flat. As a result, the overcoat layer 16 is made thin. Since the overcoat layer 16 is thin in the embodiment, the electrodes embedded in the overcoat layer 16 are exposed from the surface of the overcoat layer 16 by etching the overcoat layer 16 through dry etching such as ion milling or reactive ion etching. The pads are thereby formed. As a result, according to the embodiment, the process time for forming the overcoat layer 16 and the process time for forming the pads are greatly reduced (that is, reduced to a tenth, for example), compared to prior-art methods. The cycle time of mass-production of the thin-film magnetic heads is reduced as well.

According to the embodiment, there is no possibility of warpage of the substrate due to a thick overcoat layer or many particles generated when such a thick layer is formed through sputtering. The property and yields of the thin-film magnetic heads are therefore maintained.

According to the embodiment, the thin-film coil 5 is formed on the flat surface. It is therefore possible to reduce the coil 5 in size. As a result, the yoke length is reduced. It is thus possible to implement the thin-film magnetic head having excellent nonlinear transition shift (NLTS) and over-write properties that affect the performance characteristics of the head.

The thin-film coil 5 is covered with the insulating layer 7 of an inorganic material in the embodiment. It is therefore possible to suppress expansion of the insulating layer 7 during the use of the magnetic head and the head thereby approaching a recording medium. As a result, the amount of flying of the head is reduced.

In the embodiment, the bottom shield layer 6 and the top shield layer may be made of a high saturation flux density material. As a result, it is possible to reduce the effects of noises on the MR element 9 caused by internal factors such as magnetism generated by the coil of the induction-type recording head or external factors such as the motor of the hard disk drive. The accurate and highly sensitive reproducing head is thereby obtained.

[Second Embodiment]

Figure 18:
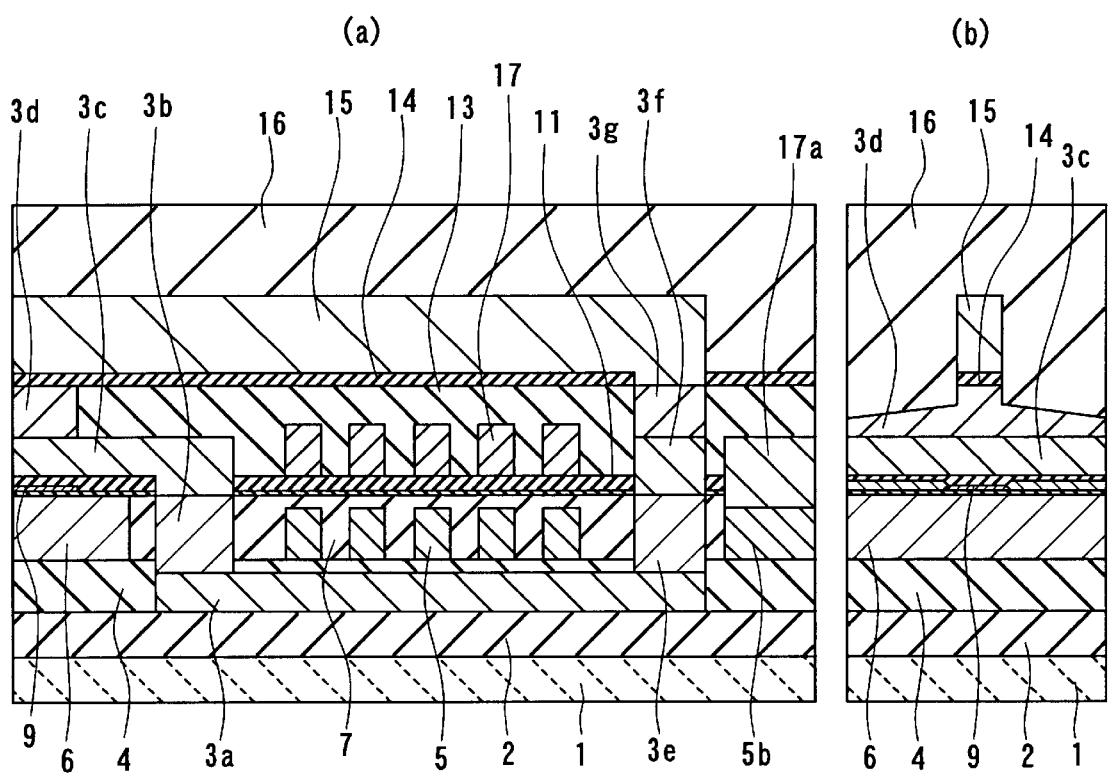
FIG. 18A and FIG. 18B are cross sections of a thin-film magnetic head of a second embodiment of the invention.
Figure 19:
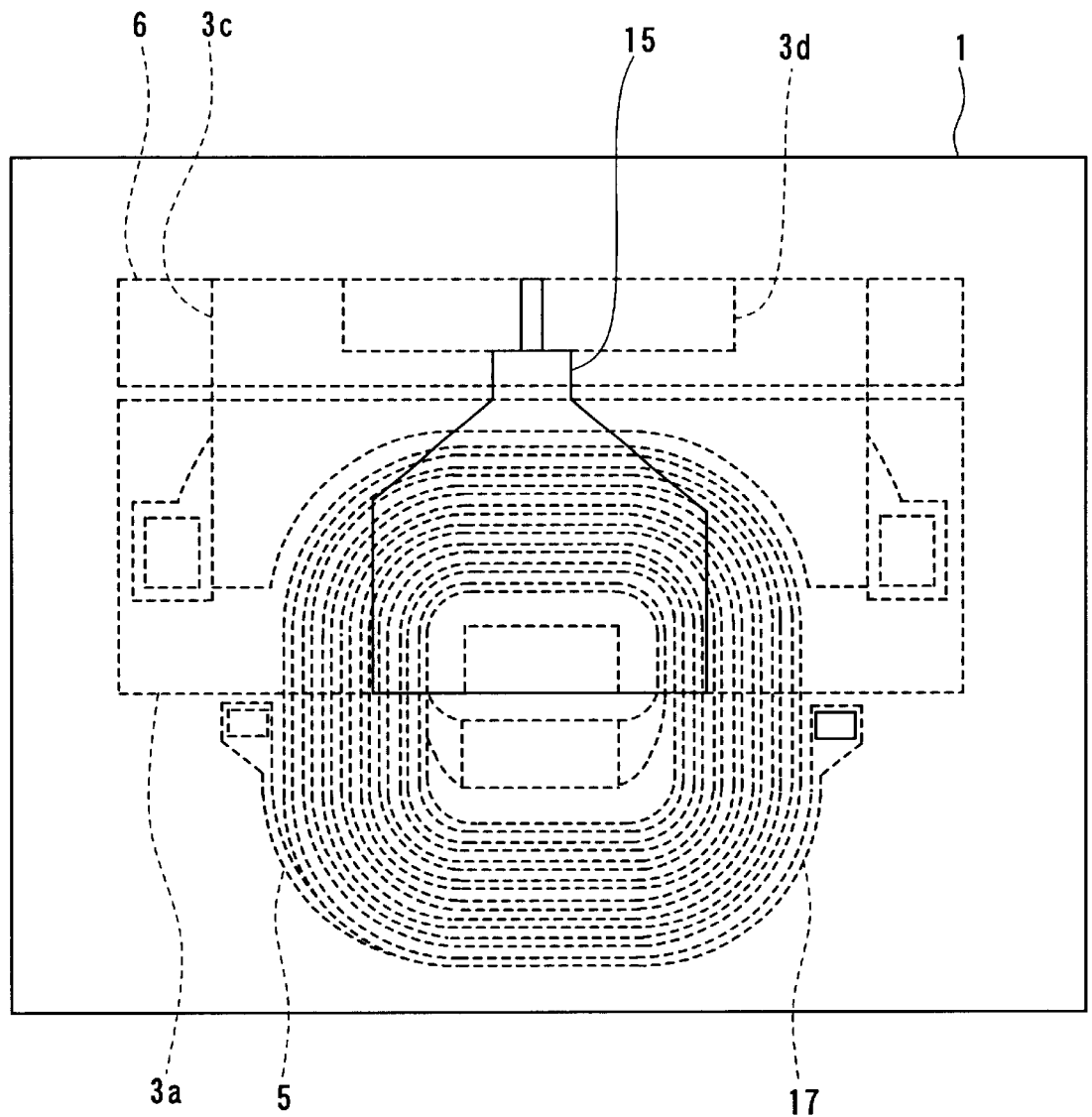
FIG. 19 is a top view of the thin-film magnetic head of the second embodiment.

Reference is now made to FIG. 18A and FIG. 18B and FIG. 19 to describe a second embodiment of the invention. FIG. 18A and FIG. 18B are cross sections of a thin-film magnetic head of the embodiment. FIG. 18A is a cross section orthogonal to the air bearing surface. FIG. 18B is a cross section of the pole portion parallel to the air bearing surface. FIG. 19 is a top view of the head. The overcoat layer is omitted in FIG. 19.

In the thin-film magnetic head of the embodiment, a thin-film coil 17 of a second layer is formed in the insulating layer 13 of the thin-film magnetic head of the first embodiment. The coil 17 of the second layer is formed on the top shield gap film 11 and on a side of the third portion 3c of the top shield layer. The coil 17 is formed through plating, for example, and has a thickness of about 1 to 2 μm. The coil 5 of the first layer is connected to the coil 17 of the second layer through the portions 5b and 17a.

The coil 17 may be formed before the third portion 3c of the top shield layer is formed. Alternatively, the coil 17 may be formed after the third portion 3c is formed and before the fourth portion 3d of the top shield layer is formed.

The remainder of configuration, functions and effects of the embodiment are similar to those of the first embodiment.

[Third Embodiment]

Reference is now made to FIG. 20A to FIG. 26A and FIG. 20B to FIG. 26B to describe a third embodiment of the invention. FIG. 20A to FIG. 26A are cross sections orthogonal to the air bearing surface. FIG. 20B to FIG. 26B are cross sections of the pole portion parallel to the air bearing surface.

In the method of the embodiment, as shown in FIG. 20A and FIG. 20B, the insulating layer 2 made of alumina ($Al_2O_3$), for example, of about 5 μm in thickness is deposited on the substrate 1 made of aluminum oxide and titanium carbide ($Al_2O_3$—TiC), for example.

Next, on the insulating layer 2, the first portion 3a of the top shield layer is selectively formed through plating, for example. The first portion 3a is made of a magnetic material such as Permalloy (NiFe) and has a thickness of about 3 μm. The first portion 3a is located in a region including a region facing the thin-film coil described later. Next, the insulating layer 4 made of an inorganic material such as alumina and having a thickness of about 4 to 5 μm is formed over the entire surface.

Next, as shown in FIG. 21A and FIG. 21B, the insulating layer 4 is polished through CMP or mechanical polishing, for example, and flattened such that the first portion 3a is exposed from the surface. An insulating layer 20 made of an inorganic material such as alumina and having a thickness of about 0.3 to 0.5 μm is formed over the entire surface.

Next, as shown in FIG. 22A and FIG. 22B, on the portion of the insulating layer 20 located on top of the first portion 3a, the thin-film coil 5 of a first layer made of copper (Cu), for example, and having a thickness of about 1 to 2 μm is formed through plating, for example. Numeral 5b in the drawings indicates a portion for connecting the coil 5 to a thin-film coil of a second layer described later. Although not shown, a seed layer having a thickness of tens of nanometers, for example, is made on the insulating layer 20 if the coil 5 is formed through plating. The seed layer may be made of Cu, NiFe, TiW, TiN or Mo.

Next, contact holes 20a and 20b are formed through selectively etching portions of the insulating layer 20 near the air-bearing-surface-side end (the left side of FIG. 22A) of the first portion 3a and near the other end. Alternatively, the above-described seed layer may be formed after forming the contact holes 20a and 20b, and the thin-film coil 5 may be then formed.

Next, on a portion of the insulating layer 20 closer to the air bearing surface than the first portion 3a, the bottom shield layer 6 made of a magnetic material such as Permalloy (NiFe) is formed. At the same time, the second portion 3b of the top shield layer is formed in the contact hole 20a on the first portion 3a. The magnetic layer 3e for making a magnetic path is formed in the contact hole 20b on the first portion 3a. The second portion 3b and the magnetic layer 3e are made of the same material as the bottom shield layer 6. The bottom shield layer 6, the second portion 3b and the magnetic layer 3e are formed through plating, for example, and have a thickness of about 3 to 3.5 µm.

Next, the insulating layer 7 made of alumina, for example, and having a thickness of about 4 to 5 µm is formed over the entire surface. Next, the insulating layer 7 is polished through CMP or mechanical polishing, for example, and flattened, such that the surfaces of the bottom shield layer 6, the second portion 3b, the magnetic layer 3e, and the thin-film coil 5 are exposed. The thickness of the thin-film coil 5 is determined by the amount of polishing the insulating layer 7.

Next, as shown in FIG. 13, a pair of conductive layers 10a made of copper (Cu), for example, are formed to be insulated from the bottom shield layer 6 and the second portion 3b of the top shield layer. The conductive layers are to be electrodes (leads) connected to an MR element described later.

Figures 23A, 23B:
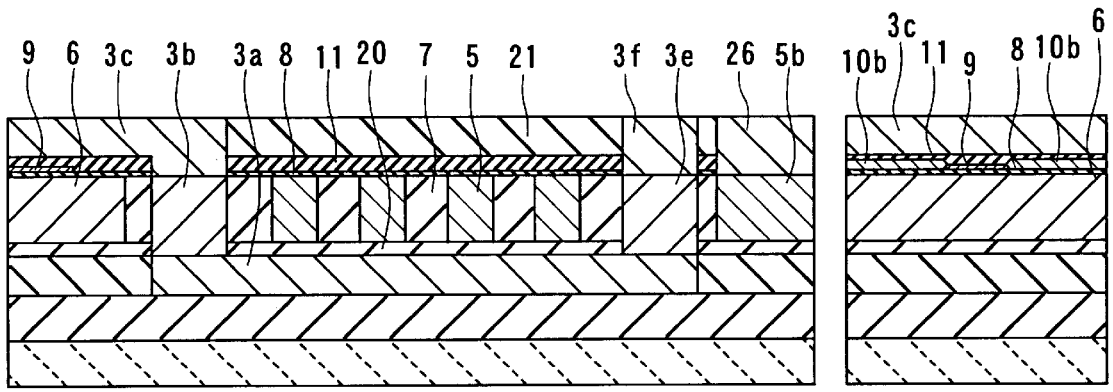
FIG. 23A and FIG. 23B are cross sections for illustrating a step that follows FIG. 22A and FIG. 22B.

Next, as shown in FIG. 23A and FIG. 23B, an insulating material such as aluminum nitride or alumina is deposited through sputtering, for example, to a thickness of 50 nm, for example, over the entire surface. The bottom shield gap film 8 as an insulating film is thereby formed.

The intermediate product in the state shown in FIG. 22A and FIG. 22B or the intermediate product shown in FIG. 22A and FIG. 22B to which the bottom shield gap film 8 is added is a thin-film magnetic head material of the embodiment.

Next, the MR element 9 for reproduction having a thickness of tens of nanometers is formed on the bottom shield gap film 8. The MR element 9 may be formed through selectively etching an MR film formed through sputtering. The MR element 9 may be an element utilizing a magneto-sensitive film that exhibits magnetoresistivity, such as a TMR element, an AMR element, or a GMR element.

Next, a pair of electrode layers 10b having a thickness of tens to hundreds of nanometers are formed through sputtering, for example, on the bottom shield gap film 8. The electrode layers 10b are electrically connected to the MR element 9 and the conductive layers 10a.

Next, an insulating material such as alumina or diamond-like carbon (DLC) is deposited through sputtering, for example, to a thickness of tens of nanometers over the entire surface. The top shield gap film 11 as an insulating film is thus formed. The MR element 9 is embedded in the shield gap films 8 and 11.

Next, portions of the shield gap films 8 and 11 are selectively removed through dry etching with a photoresist pattern as a mask. Contact holes are thereby formed in the portions on top of the second portion 3b of the top shield layer, on top of the magnetic layer 3e, and on top of the connection portion 5b of the thin-film coil 5. Dry etching may be reactive ion etching (RIE) using a BCl$_3$ base or CF$_4$ base gas. Alternatively, the above-stated contact holes may be formed through liftoff.

Next, the third portion 3c of the top shield layer made of a magnetic material such as Permalloy (NiFe) is formed through plating, for example. The third portion 3c extends from the top of the second portion 3b to the air-bearing-surface-side end. The third portion 3c is connected to the second portion 3b through the contact hole. At the same time as the third portion 3c is formed, the magnetic layer 3f and a connection portion 26 made of the same material as the third portion 3c are formed on top of the magnetic layer 3e and the connection portion 5b. The third portion 3c, the magnetic layer 3f and the connection portion 26 each have a thickness of about 1 to 2 µm.

Next, an insulating layer 21 made of an inorganic material such as alumina and having a thickness of 3 to 4 µm is formed over the entire surface. Next, the entire surface is polished through CMP or mechanical polishing, for example, and flattened so that the surfaces of the third portion 3c of the top shield layer, the magnetic layer 3f and the connection portion 26 are exposed.

Figures 24A, 24B:
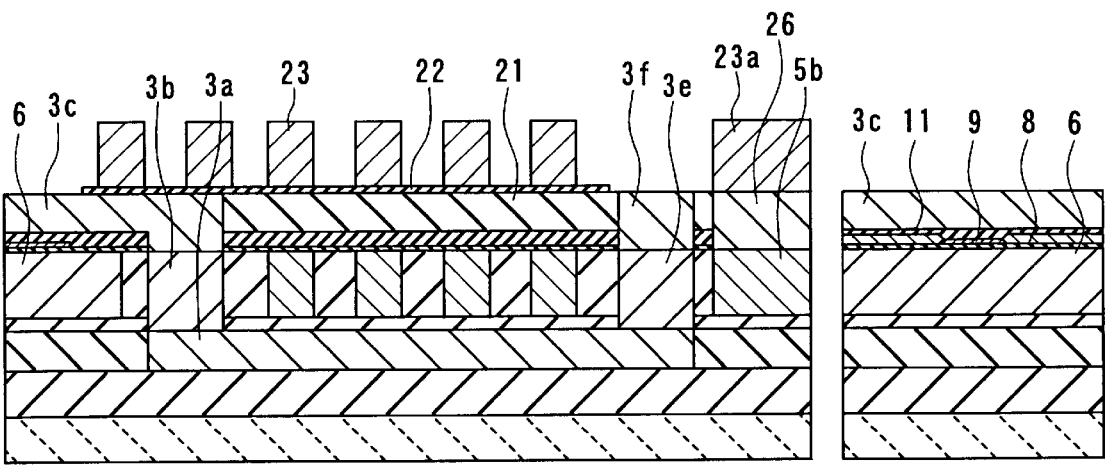
FIG. 24A and FIG. 24B are cross sections for illustrating a step that follows FIG. 23A and FIG. 23B.

Next, as shown in FIG. 24A and FIG. 24B, an insulating layer 22 made of alumina, for example, and having a thickness of 0.3 to 0.5 µm is formed on the third portion 3c and the insulating layer 21. The air-bearing-surface-side end of the insulating layer 22 is located near an end of the MR element 9 opposite to the air bearing surface.

Next, a thin-film coil 23 of a second layer having a thickness of about 1 to 2 µm is formed through plating, for example, on the insulating layer 22. The air-bearing-surface-side end of the coil 23 is located near an end of the MR element 9 opposite to the air bearing surface. Numeral 23a in the drawings indicates a portion for connecting the coil 23 to the thin-film coil 5 of the first layer. The portion 23a is connected to the portion 5b through the portion 26.

Figures 25A, 25B:
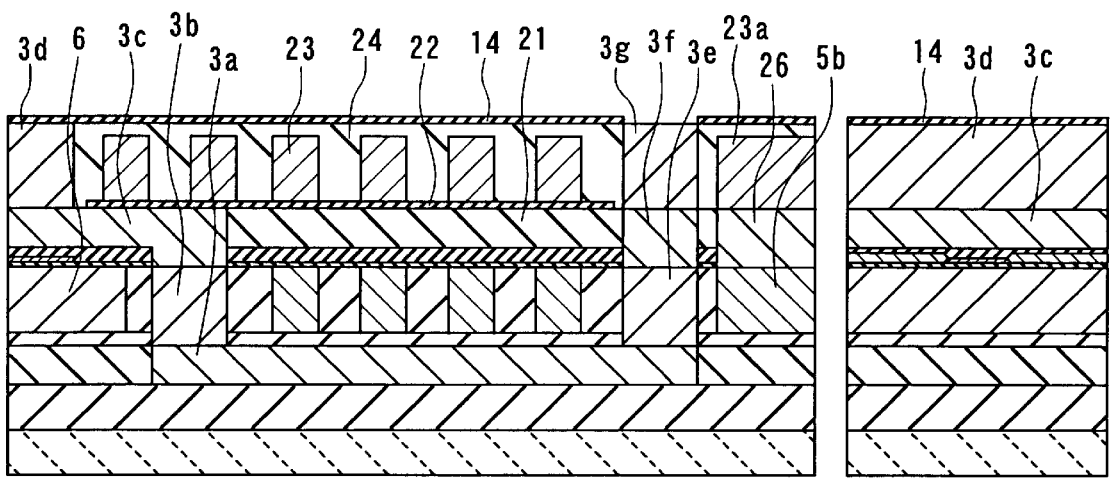
FIG. 25A and FIG. 25B are cross sections for illustrating a step that follows FIG. 24A and FIG. 24B.

Next, as shown in FIG. 25A and FIG. 25B, the fourth portion 3d of the top shield layer made of a magnetic material is formed through plating, for example, on the third portion 3c. The fourth portion 3d extends from the air-bearing-surface-side end to a specific position to define the throat height. The magnetic material used for the fourth portion 3d is preferably a high saturation flux density material such as NiFe (50 weight % Ni and 50 weight % Fe). At the same time as the fourth portion 3d is formed, the magnetic layer 3g made of the same material as the fourth portion 3d is formed on top of the magnetic layer 3f. The fourth portion 3d and the magnetic layer 3g each have a thickness of about 1.5 to 2.5 µm.

Next, an insulating layer 24 made of an inorganic material such as alumina or silicon dioxide and having a thickness of 4 to 5 µm is formed over the entire surface. Next, the entire surface is polished through CMP or mechanical polishing, for example, and flattened so that the surfaces of the fourth portion 3d of the top shield layer, the magnetic layer 3g and a portion of the coil 23 (not shown) are exposed.

Next, the recording gap layer 14 made of an insulating film such as an alumina film and having a thickness of about 150 to 250 nm, for example, is formed over the entire surface. Next, a portion of the recording gap layer 14 on top of the magnetic layer 3g is selectively removed to form a contact hole for making the magnetic path.

Figures 26A, 26B:
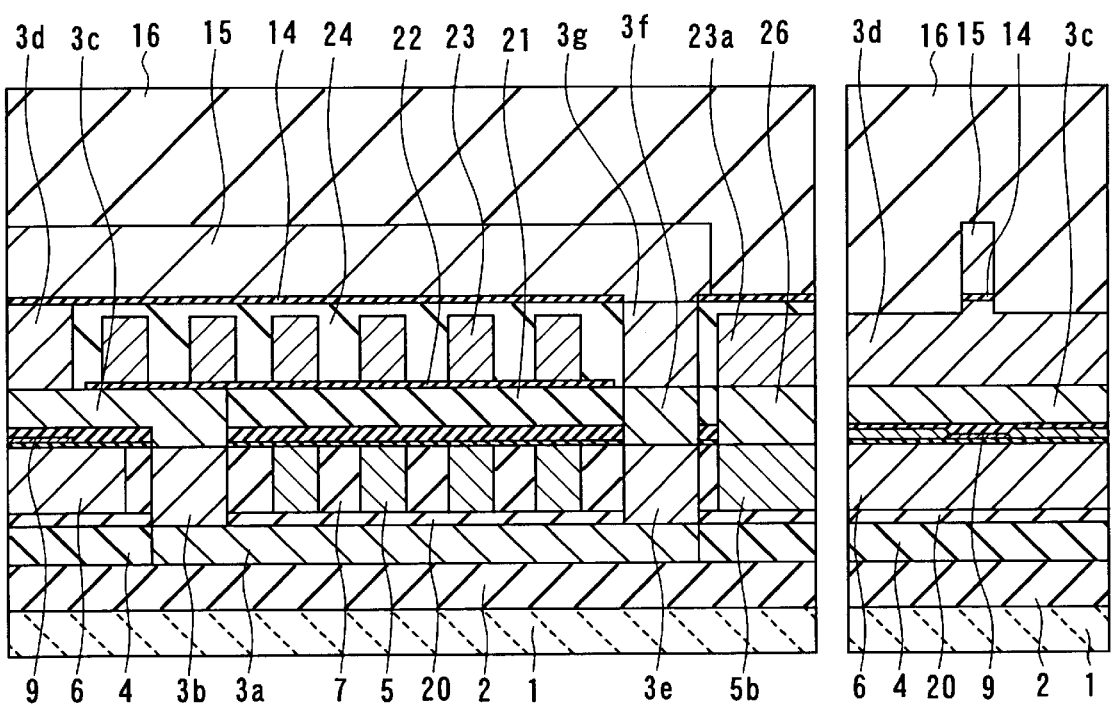
FIG. 26A and FIG. 26B are cross sections of the thin-film magnetic head of the third embodiment.

Next, as shown in FIG. 26A and FIG. 26B, on the recording gap layer 14, the top pole layer 15 having a thickness of about 3 µm is formed through plating, for example. The top pole layer 15 defines the track width of the induction-type recording head. The top pole layer 15 may be made of NiFe (80 weight % Ni and 20 weight % Fe) or a high saturation flux density material such as NiFe (45 weight % Ni and 55 weight % Fe). The top pole layer 15 is connected to the magnetic layer 3g through the contact hole formed in the recording gap layer 14.

Next, portions of the recording gap layer 14 on both sides of the top pole layer 15 are removed through dry etching. The exposed fourth portion 3d of the top shield layer is then etched through ion milling, for example, by about 0.3 to 0.5 µm, for example, with the top pole layer 15 as a mask so as to form a trim structure.

Next, the overcoat layer 16 of alumina, for example, whose thickness is about 20 to 30 μm is formed to cover the entire surface. The top surface of the overcoat layer 16 is then flattened. Pads (not shown) for electrodes connected to the reproducing head and recording head are formed on the overcoat layer 16. Finally, machine processing of the slider is performed and the air bearing surface of the recording head and the reproducing head is formed. The thin-film magnetic head is thus completed. FIG. 26A and FIG. 26B illustrate the complete head.

In this embodiment, as shown in FIG. 22A and FIG. 22B, the surface of the thin-film coil 5 is exposed in the step of flattening the insulating layer 7. As a result, control of manufacturing steps is easier and manufacturing is thus easier, compared to the case in which the insulating layer 7 is flattened such that the surface of the coil 5 is not exposed, as shown in FIG. 6A and FIG. 6B.

In this embodiment, the air-bearing-surface-side end of the thin-film coil 23 of the second layer is closer to the zero throat height position, compared to the second embodiment. The zero throat height position is the position of ends of portions of the two magnetic layers facing each other with the gap layer 14 in between, the ends of the portions being opposite to the air bearing surface. As a result, according to the third embodiment, it is possible to reduce the yoke length between the zero throat height position and the connection portions 3e to 3g. It is thus possible to implement the thin-film magnetic head having excellent nonlinear transition shift and overwrite properties.

The remainder of configuration, functions and effects of the embodiment are similar to those of the first embodiment.

[Fourth Embodiment]

Figures 27A, 27B:
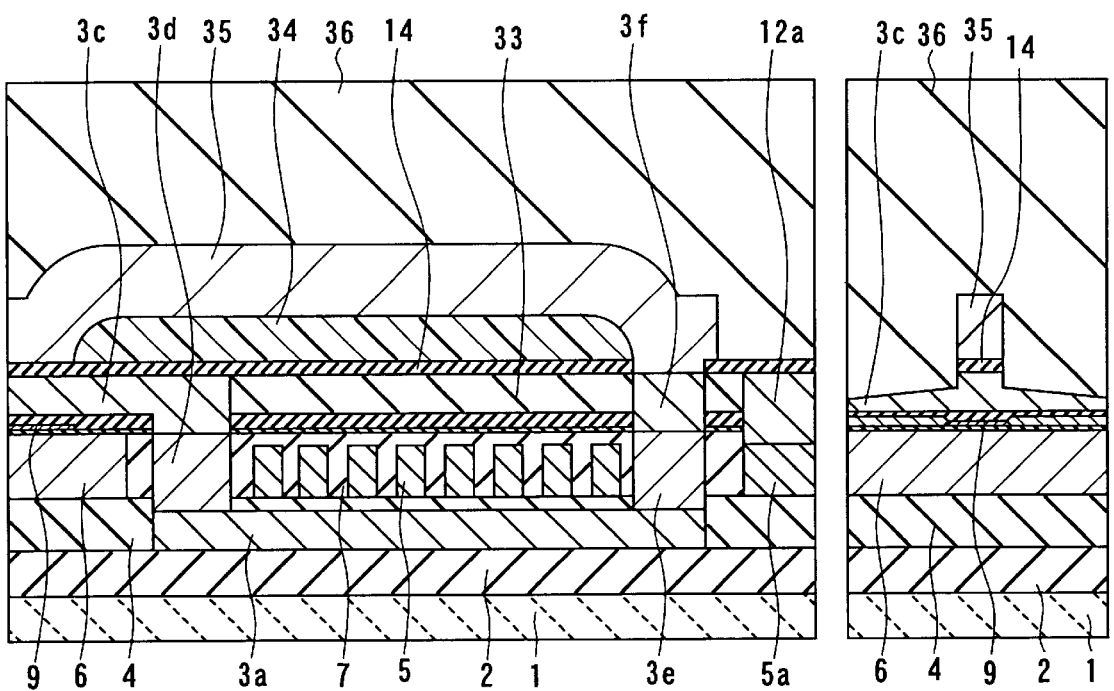
FIG. 27A and FIG. 27B are cross sections of a thin-film magnetic head of a fourth embodiment of the invention.

Reference is now made to FIG. 27A and FIG. 27B to describe a fourth embodiment of the invention. FIG. 27A and FIG. 27B are cross sections of a thin-film magnetic head of this embodiment. FIG. 27A is a cross section orthogonal to the air bearing surface. FIG. 27B is a cross section of the pole portion parallel to the air bearing surface.

The configuration of the head of the third embodiment, including the layers from the substrate 1 to the third portion 3c of the top shield layer, the magnetic layer 3f and the terminal portion 12a, that is, the configuration shown in FIG. 8A and FIG. 8B, and the method of manufacturing the same are similar to those of the first embodiment.

Only part of the configuration of the head of the third embodiment and the method of manufacturing the same that is different from the first embodiment will now be described. In the method of the third embodiment, an insulating layer 33 made of an inorganic material such as alumina and having a thickness of 3 to 4 μm is formed over the entire surface in the state shown in FIG. 8A and FIG. 8B. The entire surface is then polished through CMP or mechanical polishing, for example, so that the surfaces of the third portion 3c of the top shield layer, the magnetic layer 3f and the terminal portion 12a are exposed.

Next, the recording gap layer 14 made of an insulating film such as an alumina film and having a thickness of about 150 to 250 nm, for example, is formed over the entire surface. Next, a portion of the recording gap layer 14 on top of the magnetic layer 3f is selectively removed to form a contact hole for making a magnetic path.

Next, on the recording gap layer 14, a photoresist, for example, is formed into a specific pattern to form an insulating layer 34 for defining the throat height. A sufficient thickness of the insulating layer 34 is about 1 to 2 μm. Next, a top pole layer 35 having a thickness of about 3 μm is formed through plating, for example, on the recording gap layer 14 and the insulating layer 34. The top pole layer 35 defines the track width of the recording head. The top pole layer 35 is connected to the magnetic layer 3f through the contact hole formed in the recording gap layer 14.

Next, portions of the recording gap layer 14 on both sides of the top pole layer 35 are removed through dry etching. The exposed third portion 3c of the top shield layer is then etched through ion milling, for example, by about 0.3 to 0.5 μm, for example, with the top pole layer 35 as a mask so as to form a trim structure.

Next, an overcoat layer 36 of alumina, for example, whose thickness is about 20 to 30 μm is formed to cover the entire surface. The top surface of the overcoat layer 36 is then flattened. Pads (not shown) for electrodes connected to the reproducing head and recording head are formed on the overcoat layer 36. Finally, machine processing of the slider is performed and the air bearing surface of the recording head and the reproducing head is formed. The thin-film magnetic head is thus completed.

In this embodiment the fourth portion 3d of the top shield layer that defines the throat height in the first embodiment is not provided. As a result, the number of manufacturing steps is reduced and manufacture of the head is made easier.

In this embodiment the top pole layer 35 that defines the track width is formed on the surface having a difference in level. However, since such a difference is as small as 1 to 2 μm, it is possible to achieve a narrow track.

The remainder of configuration, functions and effects of the embodiment are similar to those of the first embodiment.

[Fifth Embodiment]

Figures 28A, 28B:
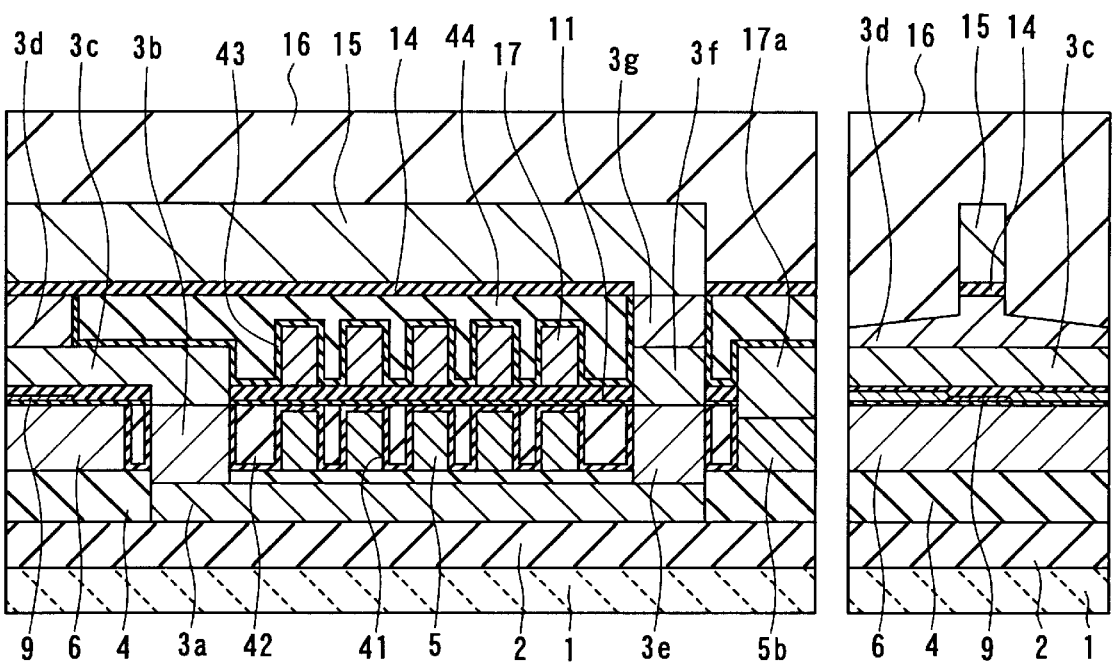
FIG. 28A and FIG. 28B are cross sections of a thin-film magnetic head of a fifth embodiment of the invention.

Reference is now made to FIG. 28A and FIG. 28B to describe a fifth embodiment of the invention. FIG. 28A and FIG. 28B are cross sections of a thin-film magnetic head of this embodiment. FIG. 28A is a cross section orthogonal to the air bearing surface. FIG. 28B is a cross section of the pole portion parallel to the air bearing surface.

The configuration of the head of the fifth embodiment is almost similar to that of the head of the second embodiment except the following points. In the fifth embodiment a thin insulating layer 41 having a thickness of about 50 to 100 and an insulating layer 42 are provided in place of the insulating layer 7. The insulating layer 41 is made of alumina, for example, and formed through sputtering, for example, along the surface of the thin-film coil 5 to form a thin layer covering the coil 5. The insulating layer 42 is made of spin-on-glass (SOG) film or a photoresist film, for example, to cover the insulating layer 41 and fill the concave spaces between the turns of the coil.

In this embodiment a thin insulating layer 43 having a thickness of about 50 to 100 nm and an insulating layer 44 are provided in place of the insulating layer 13. The insulating layer 43 is made of alumina, for example, and formed through sputtering, for example, along the surface of the thin-film coil 17 to form a thin layer covering the coil 17. The insulating layer 44 is made of SOG film or a photoresist film, for example, to cover the insulating layer 43 and fill the concave spaces between the turns of the coil.

If the insulating layers 7 and 13 are formed through filling the spaces between the turns of the coil with an insulating material such as alumina, a gap may be produced between the coil 5 and the insulating layer 7 and between the coil 17 and the insulating layer 13 if the coil pitch is reduced. The fifth embodiment prevents generation of such a gap.

The remainder of configuration, functions and effects of the embodiment are similar to those of the second embodiment.

[Sixth Embodiment]

Reference is now made to FIG. 29A to FIG. 37A and FIG. 29B to FIG. 37B to describe a sixth embodiment of the invention. FIG. 29A to FIG. 37A are cross sections each orthogonal to the air bearing surface. FIG. 29B to FIG. 37B are cross sections of the pole portion of the head parallel to the air bearing surface.

In the method of this embodiment, as shown in FIG. 29A and FIG. 29B, the insulating layer 2 made of alumina ($Al_2O_3$), for example, of about 5 μm in thickness is deposited on the substrate 1 made of aluminum oxide and titanium carbide ($Al_2O_3$—TiC), for example.

Next, a portion of the insulating layer 2 where the first portion of the top shield layer is to be formed is selectively etched to make a concave portion 2a having a depth of about 2 to 3 μm. This etching may be reactive ion etching (RIE) using a $Cl_2$ base or $BCl_2$ base gas.

Next, on the insulating layer 2, a magnetic layer 43 made of a magnetic material such as Permalloy (NiFe) and having a thickness of about 3 μm is selectively formed through plating, for example.

Next, as shown in FIG. 30A and FIG. 30B, the magnetic layer 43 is polished through CMP or mechanical polishing, for example, and flattened such that the surface of the insulating layer 2 is exposed. The first portion 3a of the top shield layer is thereby made of the remaining portion of the magnetic layer 43. The first portion 3a is located in a region including a region facing a thin-film coil described later.

Next, as shown in FIG. 31A and FIG. 31B, the second portion 3b of the top shield layer is formed on the first portion 3a near the air-bearing-surface-side end. The magnetic layer 3e is formed for making the magnetic path on the first portion 3a near an end opposite to the air bearing surface. The second portion 3b and the magnetic layer 3e are formed through plating, for example, and have a thickness of about 2 to 3 μm.

Next, an insulating layer 44 made of an inorganic material such as alumina and having a thickness of about 0.3 to 0.5 μm is formed over the entire surface.

Next, the bottom shield layer 6 made of a magnetic material such as Permalloy (NiFe) is formed on a portion of the insulating layer 44 closer to the air bearing surface than the second portion 3b. The bottom shield layer 6 is formed through plating, for example, and has a thickness of about 3 μm.

Figures 32A, 32B:
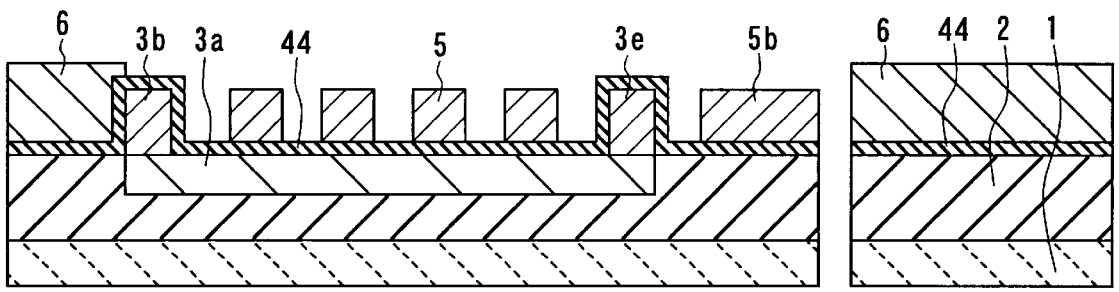

Next, as shown in FIG. 32A and FIG. 32B, on a portion of the insulating layer 44 located on top of the first portion 3a and on a side of the second portion 3b, the thin-film coil 5 of a first layer made of copper (Cu), for example, and having a thickness of about 1 to 2 μm is formed through plating, for example. Numeral 5b in the drawings indicates a portion for connecting the coil 5 to a thin-film coil of a second layer described later. Although not shown, a seed layer having a thickness of tens of nanometers, for example, is made on the insulating layer 44 if the coil 5 is formed through plating. The seed layer may be made of Cu, NiFe, TiW, TiN or Mo.

Figures 33A, 33B:
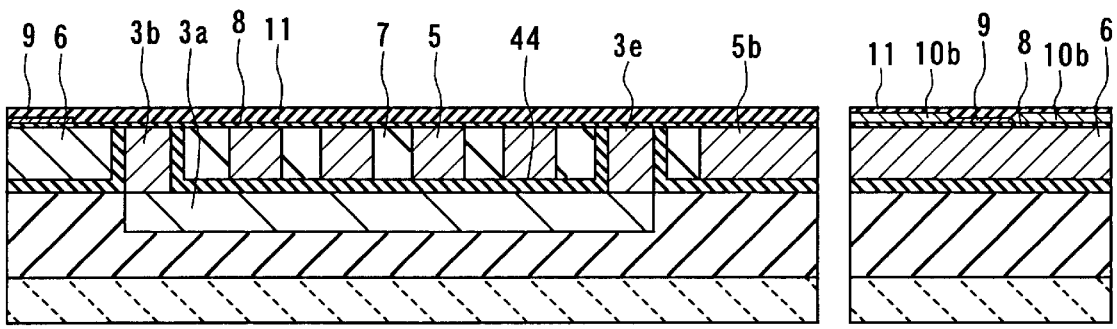
FIG. 33A and FIG. 33B are cross sections for illustrating a step that follows FIG. 32A and FIG. 32B.

Next, as shown in FIG. 33A and FIG. 33B, the insulating layer 7 made of alumina, for example, and having a thickness of about 4 to 5 μm is formed over the entire surface. Next, the insulating layer 7 is polished through CMP or mechanical polishing, for example, and flattened, such that the surfaces of the bottom shield layer 6, the second portion 3b, the magnetic layer 3e, and the thin-film coil 5 are exposed. The thickness of the thin-film coil 5 is determined by the amount of polishing the insulating layer 7.

Next, as shown in FIG. 13, a pair of conductive layers 10a made of copper (Cu), for example, are formed to be insulated from the bottom shield layer 6 and the second portion 3b of the top shield layer. The conductive layers are to be electrodes (leads) connected to an MR element described later.

Next, an insulating material such as aluminum nitride or alumina is deposited through sputtering, for example, to a thickness of 50 nm, for example, over the entire surface. The bottom shield gap film 8 as an insulating film is thereby formed.

The intermediate product in the state immediately before the bottom shield gap film 8 is formed or the intermediate product to which the bottom shield gap film 8 is added is a thin-film magnetic head material of the embodiment.

Next, the MR element 9 for reproduction having a thickness of tens of nanometers is formed on the bottom shield gap film 8. The MR element 9 may be formed through selectively etching an MR film formed through sputtering. The MR element 9 may be an element utilizing a magneto-sensitive film that exhibits magnetoresistivity, such as a TMR element, an AMR element, or a GMR element.

Next, a pair of electrode layers 10b having a thickness of tens to hundreds of nanometers are formed through sputtering, for example, on the bottom shield gap film 8. The electrode layers 10b are electrically connected to the MR element 9 and the conductive layers 10a.

Next, an insulating material such as alumina or diamond-like carbon (DLC) is deposited through sputtering, for example, to a thickness of tens of nanometers over the entire surface. The top shield gap film 11 as an insulating film is thus formed. The MR element 9 is embedded in the shield gap films 8 and 11.

Figures 34A, 34B:
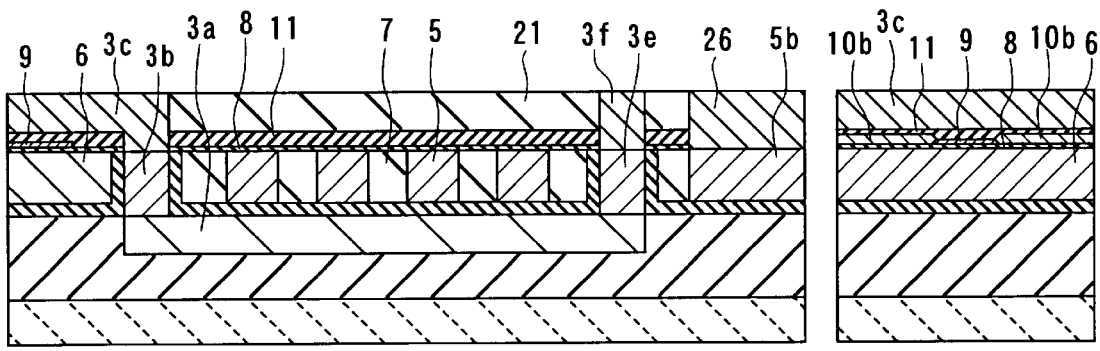
FIG. 34A and FIG. 34B are cross sections for illustrating a step that follows FIG. 33A and FIG. 33B.

Next, as shown in FIG. 34A and FIG. 34B, portions of the shield gap films 8 and 11 are selectively removed through dry etching with a photoresist pattern as a mask. Contact holes are thereby formed in the portions on top of the second portion 3b of the top shield layer, on top of the magnetic layer 3e, and on top of the connection portion 5b of the thin-film coil 5, respectively. Dry etching may be reactive ion etching (RIE) using a $BCl_3$ base or $CF_4$ base gas. Alternatively, the above-stated contact holes may be formed through liftoff.

Next, the third portion 3c of the top shield layer made of a magnetic material such as Permalloy (NiFe) is formed through plating, for example. The third portion 3c extends from the top of the second portion 3b to the air-bearing-surface-side end. The third portion 3c is connected to the second portion 3b through the contact hole. At the same time as the third portion 3c is formed, the magnetic layer 3f and the connection portion 26 made of the same material as the third portion 3c are formed on top of the magnetic layer 3e and the connection portion 5b. The third portion 3c, the magnetic layer 3f and the connection portion 26 each have a thickness of about 1 to 2 μm.

Next, the insulating layer 21 made of alumina, for example, and having a thickness of 3 to 4 μm is formed over the entire surface. Next, the entire surface is polished through CMP or mechanical polishing, for example, and flattened so that the surfaces of the third portion 3c of the top shield layer, the magnetic layer 3f and the connection portion 26 are exposed.

Figures 35A, 35B:
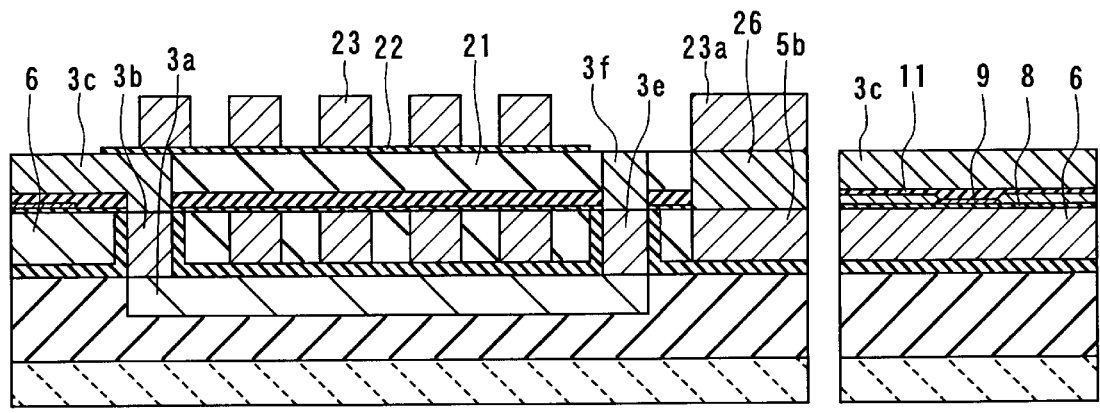
FIG. 35A and FIG. 35B are cross sections for illustrating a step that follows FIG. 34A and FIG. 34B.

Next, as shown in FIG. 35A and FIG. 35B, the insulating layer 22 made of alumina, for example, and having a thickness of 0.3 to 0.5 μm is formed on the third portion 3c and the insulating layer 21. The air-bearing-surface-side end of the insulating layer 22 is located near an end of the MR element 9 opposite to the air bearing surface.

Next, the thin-film coil 23 of the second layer having a thickness of about 1 to 2 μm is formed through plating, for example, on the insulating layer 22. The air-bearing-surface-side end of the coil 23 is located near an end of the MR element 9 opposite to the air bearing surface. Numeral 23a in the drawings indicates a portion for connecting the coil 23 to the thin-film coil 5 of the first layer. The portion 23a is connected to the portion 5b through the portion 26.

Figures 36A, 36B:
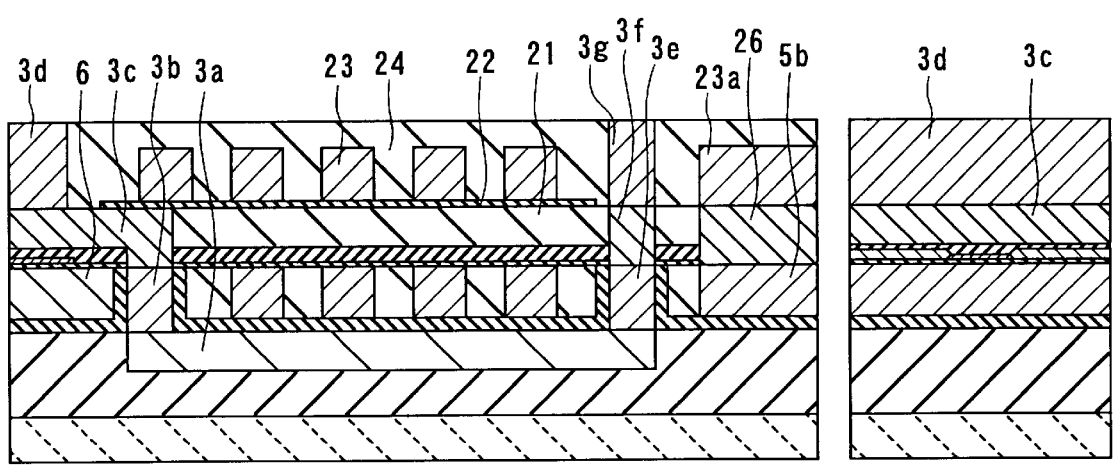
FIG. 36A and FIG. 36B are cross sections for illustrating a step that follows FIG. 35A and FIG. 35B.

Next, as shown in FIG. 36A and FIG. 36B, the fourth portion 3d of the top shield layer made of a magnetic material is formed through plating, for example, on the third portion 3c. The fourth portion 3d extends from the air-bearing-surface-side end to a specific position to define the throat height. The magnetic material used for the fourth portion 3d is preferably a high saturation flux density material such as NiFe (50 weight % Ni and 50 weight % Fe). At the same time as the fourth portion 3d is formed, the magnetic layer 3g made of the same material as the fourth portion 3d is formed on top of the magnetic layer 3f. The fourth portion 3d and the magnetic layer 3g each have a thickness of about 1.5 to 2.5 μm.

Next, the insulating layer 24 made of alumina or silicon dioxide, for example, and having a thickness of 4 to 5 μm is formed over the entire surface. Next, the entire surface is polished through CMP or mechanical polishing, for example, and flattened so that the surfaces of the fourth portion 3d of the top shield layer, the magnetic layer 3g and a portion of the coil 23 (not shown) are exposed.

Figures 37A, 37B:
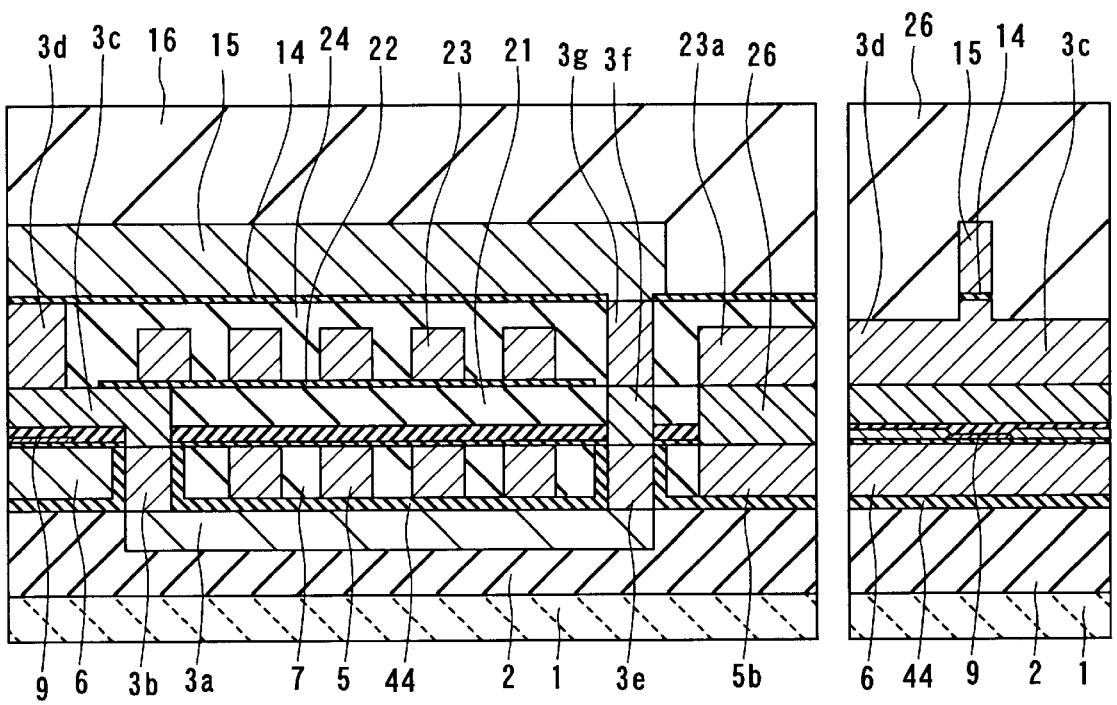
FIG. 37A and FIG. 37B are cross sections of the thin-film magnetic head of the sixth embodiment.
Figure 47:
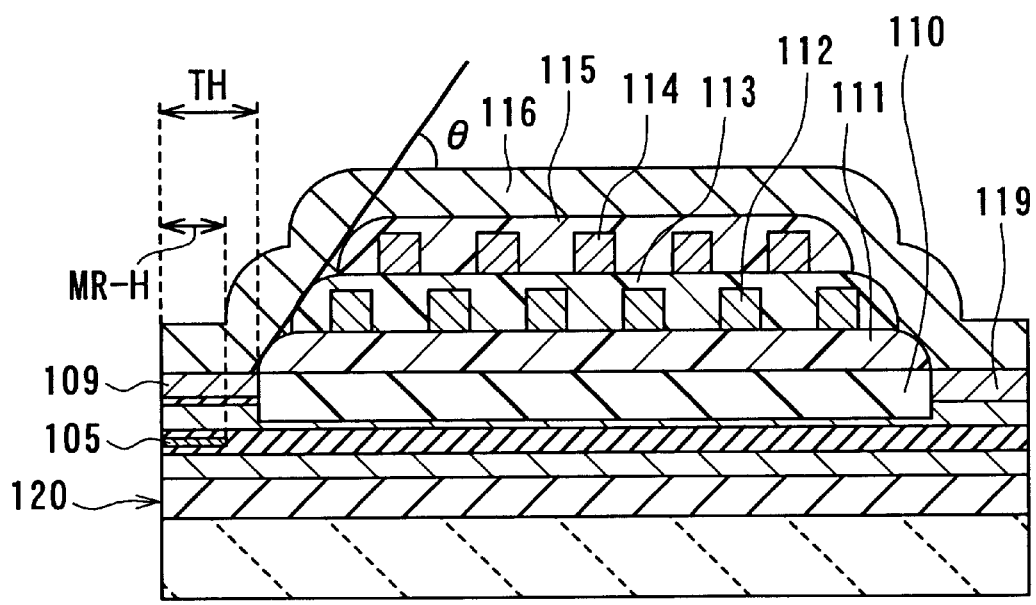
FIG. 47 is a cross section of the related-art thin-film magnetic head orthogonal to the air bearing surface.
Figure 48:
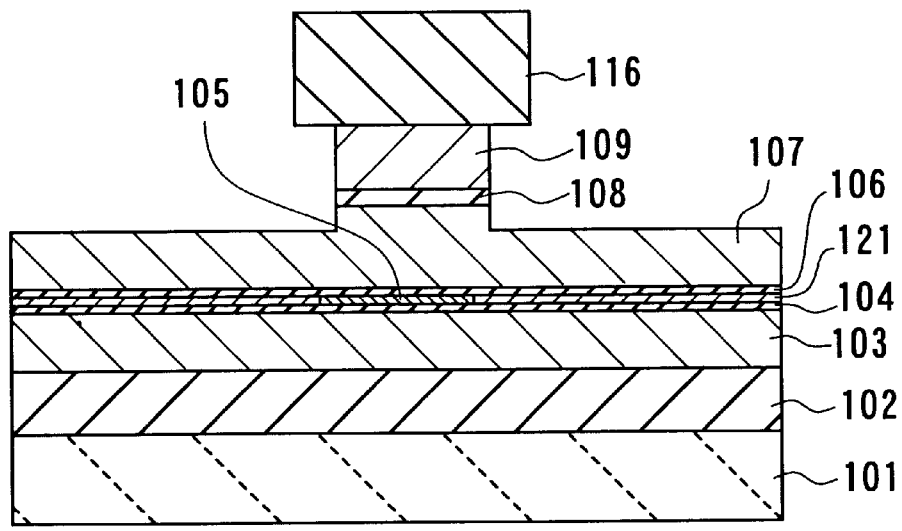
FIG. 48 is a cross section of the related-art thin-film magnetic head parallel to the air bearing surface.
Figure 49:
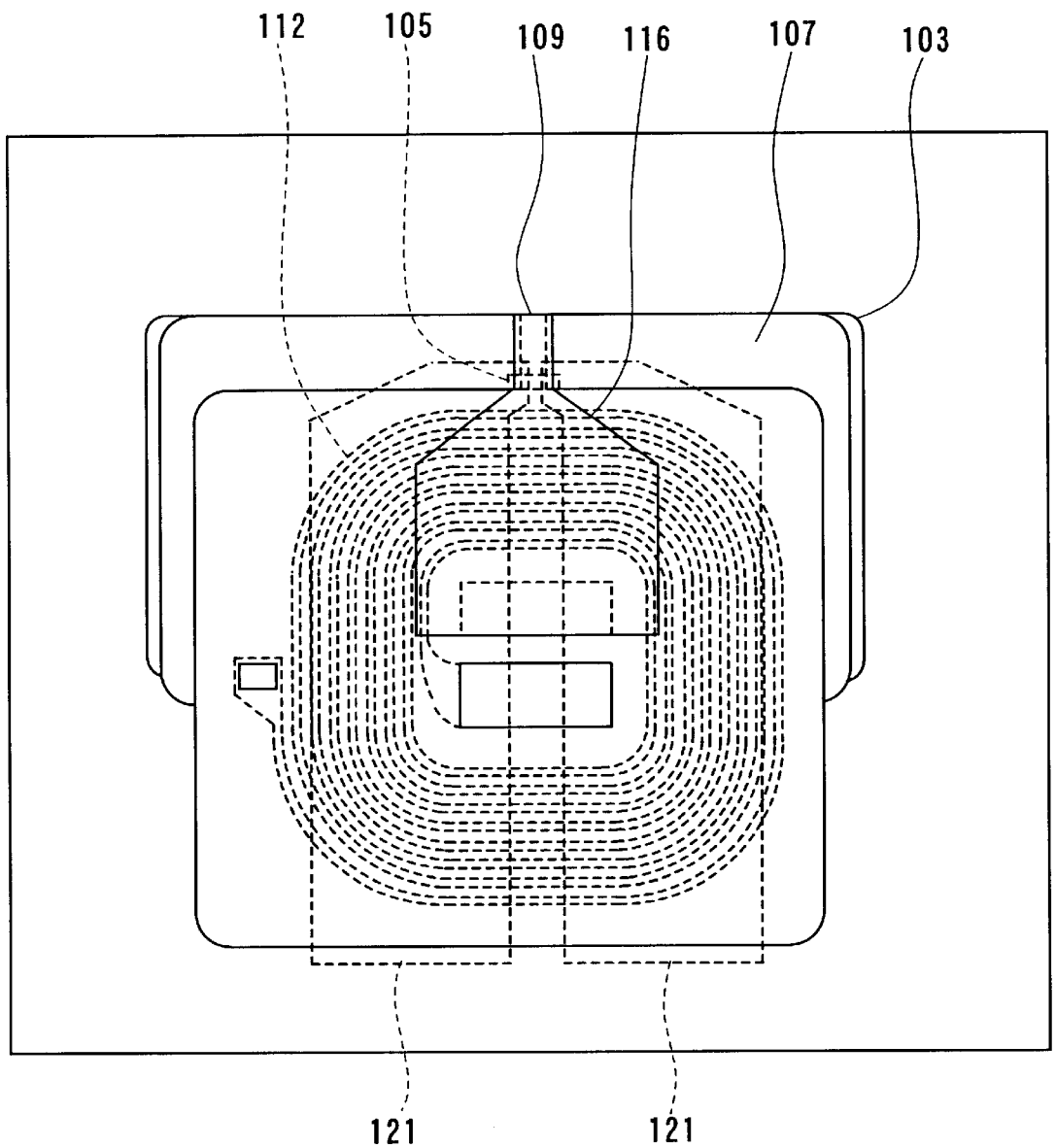
FIG. 49 is a top view of the related-art thin-film magnetic head.

Next, as shown in FIG. 37A and FIG. 37B, the recording gap layer 14 made of an insulating film such as an alumina film and having a thickness of about 150 to 250 nm, for example, is formed over the entire surface. Next, a portion of the recording gap layer 14 on top of the magnetic layer 3g is selectively removed to form a contact hole for making the magnetic path.

Next, on the recording gap layer 14, the top pole layer 15 having a thickness of about 3 μm is formed through plating, for example. The top pole layer 15 defines the track width of the induction-type recording head. The top pole layer 15 may be made of NiFe (80 weight % Ni and 20 weight % Fe) or a high saturation flux density material such as NiFe (45 weight % Ni and 55 weight % Fe). The top pole layer 15 is connected to the magnetic layer 3g through the contact hole formed in the recording gap layer 14.

Next, portions of the recording gap layer 14 on both sides of the top pole layer 15 are removed through dry etching. The exposed fourth portion 3d of the top shield layer is then etched through ion milling, for example, by about 0.3 to 0.5 μm, for example, with the top pole layer 15 as a mask so as to form a trim structure.

Next, the overcoat layer 16 of alumina, for example, whose thickness is about 20 to 30 μm is formed to cover the entire surface. The top surface of the overcoat layer 16 is then flattened. Pads (not shown) for electrodes connected to the reproducing head and recording head are formed on the overcoat layer 16. Finally, machine processing of the slider is performed and the air bearing surface of the recording head and the reproducing head is formed. The thin-film magnetic head is thus completed. FIG. 37A and FIG. 37B illustrate the complete head.

In this embodiment, the bottom shield layer 6 and the second portion 3b of the top shield layer are located close to each other while the shield layer 6 and the portion 3b are insulated from each other with the thin insulating layer 44. As a result, it is possible to reduce the yoke length between the zero throat height position and the connection portions 3e to 3g. It is thus possible to implement the thin-film magnetic head having excellent nonlinear transition shift and overwrite properties.

The remainder of configuration, functions and effects of the embodiment are similar to those of the third embodiment.

The present invention is not limited to the foregoing embodiments but may be practiced in still other ways. For example, although the top pole layer of the recording head is made up of the single layer in the foregoing embodiments, the top pole layer may be made of a plurality of layers.

According to the thin-film magnetic head and the method of manufacturing the same and the thin-film magnetic head material and the method of manufacturing the same of the invention thus described, the thin-film magnetic head material comprising the first shield layer, the first and second portions of the second shield layer, and at least part of the thin-film coils is manufactured. In response to the customer's requests, the third portion of the second shield layer, the MR element, and the second magnetic layer are added to the material. The thin-film magnetic head is thus manufactured. As a result, according to the invention, it is possible to provide thin-film magnetic heads that meet the specifications required by the customer in a short period of time. In addition, the materials may be inspected so that it is possible to process only conforming materials into thin-film magnetic heads. The yields of the heads are thereby improved.

According to the invention, at least part of the thin-film coil is placed on a side of the second portion of the second shield layer. Consequently, the second magnetic layer that defines the track width is formed on a flat or nearly flat surface. As a result, it is possible to reduce the track width of the recording head without reducing the performance characteristics and yield.

According to the invention, the magnetoresistive element is formed after at least part of the thin-film coil is formed. In addition, the number of manufacturing steps after the formation of the magnetoresistive element is reduced. A reduction in characteristics of the reproducing head and damage to the head are therefore prevented.

According to the invention, the second magnetic layer is formed on a flat or nearly flat surface. It is therefore possible to reduce the thickness of the overcoat layer.

According to the invention, at least part of the thin-film coil is formed on the flat surface of the first portion of the second shield layer. It is thereby possible to reduce the dimensions of the at least part of the thin-film coil. As a result, it is possible to reduce the yoke length and to implement the thin-film magnetic head having excellent characteristics.

In the thin-film magnetic head or the method of manufacturing the same, the second magnetic layer may be made of a single layer. In this case, it is possible to reduce the track width of the recording head without reducing the performance characteristics and yield.

In the thin-film magnetic head or the method of manufacturing the same, the fourth portion of the second shield layer that defines the throat height may be provided. In this case, the second magnetic layer is formed on a flat or nearly flat surface. It is therefore possible to reduce the track width of the recording head without reducing the performance characteristics and yield.

In the invention the first insulating layer formed along the surface of the thin-film coil and the second insulating layer covering the first insulating layer may be provided. In this case, it is possible to prevent generation of gaps between the thin-film coil and the insulating layers.

In the invention the second portion is separated from the first shield layer by the insulating layer formed along the surfaces of the first and second portions of the second shield layer. In this case, it is further possible to reduce the yoke length and to implement the thin-film magnetic head having excellent characteristics.

In the invention the insulating layer made of an inorganic material that covers the thin-film coil may be provided. In this case, it is possible to suppress expansion of the insulating layer during the use of the magnetic head and the head thereby approaching a recording medium. As a result, the amount of flying of the head is reduced.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head including:

a reproducing head including: a magnetoresistive element; and a first shield layer and a second shield layer for shielding the magnetoresistive element, portions of the first and second shield layers located on a side of a medium facing surface that faces toward a recording medium being opposed to each other with the magnetoresistive element in between; and a recording head including: a first magnetic layer and a second magnetic layer magnetically coupled to each other each of which includes at least one layer, the first and second magnetic layers including magnetic pole portions opposed to each other and placed in regions on a side of the medium facing surface; a gap layer placed between the pole portions of the first and second magnetic layers; and a thin-film coil at least part of which is placed between the first and second magnetic layers and insulated from the first and second magnetic layers; wherein:

the second shield layer includes: a first portion placed in a region including a region facing the thin-film coil; a second portion connected to a surface of the first portion facing the coil and placed on a side of the first shield layer; and a third portion connected to the second portion and facing the first shield layer, the MR element being placed between the third portion and the first shield layer; and the second shield layer also functions as the first magnetic layer; and the at least part of the thin-film coil is placed on a side of the second portion of the second shield layer; the method comprising:

forming the first portion of the second shield layer;

forming at least part of the thin-film coil such that the at least part of the coil is placed on the first portion and insulated from the first portion;

forming the second portion of the second shield layer such that the second portion is located on the side of the at least part of the coil and connected to the surface of the first shield layer facing the coil;

forming the first shield layer on a side of the second portion;

forming the magnetoresistive element on an insulating film formed on the first shield layer subsequent to forming the first and second portions;

forming the third portion of the second shield layer on an insulating film formed on the magnetoresistive element subsequent to forming the magnetoresistive element;

forming the gap layer on the third portion; and forming the second magnetic layer on the gap layer.

2. The method according to claim 1 wherein the second magnetic layer is made up of a single layer.

3. The method according to claim 1, further including the step of forming a fourth portion of the second shield layer that is connected to a surface of the third portion facing the gap layer and defines a throat height.

4. The method according to claim 3 wherein the second magnetic layer is made of a single flat layer.

5. The method according to claim 3, further including the step of forming a second layer portion of the thin-film coil on a side of the fourth portion of the second shield layer.

6. The method according to claim 5, further including the steps of:

forming an insulating layer on a side of the third portion of the second shield layer; and flattening a surface facing the second layer portion of each of the third portion and the insulating layer.

7. The method according to claim 1, further including the step of forming a second layer portion of the thin-film coil on a side of the third portion of the second shield layer.

8. The method according to claim 1, further including the step of flattening a surface facing the magnetoresistive element of each of the first shield layer, the second portion of the second shield layer, and the at least part of the coil.

9. The method according to claim 1, further including the step of forming an insulating layer that defines a throat height on the gap layer, wherein the second magnetic layer is formed on the gap layer and the insulating layer.

10. The method according to claim 1, further including the steps of:

forming a first insulating layer along a surface of the thin-film coil; and forming a second insulating layer that covers the first insulating layer.

11. The method according to claim 1, further including the step of forming an insulating layer along surfaces of the first portion and the second portion of the second shield layer, wherein the first shield layer is separated from the second portion by the insulating layer.

12. The method according to claim 1, further including the step of forming an insulating layer made of an inorganic material that covers the thin-film coil.

13. The method according to claim 1, further including the steps of forming an insulating layer covering the first portion of the second shield layer; and flattening a surface of the insulating layer facing the coil.

14. The method according to claim 1, further including the steps of:

forming an insulating layer having a concave portion in a region corresponding to the first portion of the second shield layer; and forming a layer of a shield material on the insulating layer, wherein the first portion is formed in the concave portion through flattening the layer of the shield material.

* * * * *